US012228895B2

(12) United States Patent
Martinez et al.

(10) Patent No.: US 12,228,895 B2
(45) Date of Patent: Feb. 18, 2025

(54) OPTIMIZATION CONTROLLER FOR DISTRIBUTED ENERGY RESOURCES

(71) Applicant: Heila Technologies, Inc., Somerville, MA (US)

(72) Inventors: Jorge Elizondo Martinez, Somerville, MA (US); Seth Calvert Drew, Somerville, MA (US); Trudie Wang, Oakland, CA (US); Shuyang Li, Oakland, CA (US)

(73) Assignee: Discovery Energy, LLC, Kohler, WI (US)

( * ) Notice: Subject to any disclaimer, the term of this patent is extended or adjusted under 35 U.S.C. 154(b) by 549 days.

(21) Appl. No.: 17/566,537

(22) Filed: Dec. 30, 2021

(65) Prior Publication Data
US 2022/0215486 A1 Jul. 7, 2022

Related U.S. Application Data

(60) Provisional application No. 63/131,968, filed on Dec. 30, 2020.

(51) Int. Cl.
*G05B 13/04* (2006.01)
*G06Q 50/06* (2012.01)
(Continued)

(52) U.S. Cl.
CPC ......... *G05B 13/048* (2013.01); *G05B 13/041* (2013.01); *G05B 13/042* (2013.01);
(Continued)

(58) Field of Classification Search
CPC ....... G06Q 50/06; G05B 13/048; H02J 3/004; H02J 3/381; H02J 2203/10; H02J 2203/20
See application file for complete search history.

(56) References Cited

U.S. PATENT DOCUMENTS 7,167,817 B2 1/2007 Mosterman et al.
8,015,069 B2 9/2011 Saigh
(Continued)

FOREIGN PATENT DOCUMENTS

CN 107679776 A 2/2018
CN 108306292 A 7/2018
(Continued)

OTHER PUBLICATIONS

Extended European Search Report for European Patent Application No. 18842360.2, dated Dec. 22, 2020 (6 pages).
(Continued)

*Primary Examiner* — Mong-Shune Chung
(74) *Attorney, Agent, or Firm* — The Belles Group, P.C.

(57) ABSTRACT

An asset manager is configured to control distribution of power within an aggregated distributed energy resources system. The asset manager is configured to solve a given asset model that models a real asset. The asset controller is configured to optimize a setpoint of the asset by determining a first trajectory over the course of a first prediction horizon and a second trajectory over the course of a second prediction horizon that is temporally shorter than the first prediction horizon. The trajectories are determined by minimizing a cost function associated with the DER model or a DERs system model. The first prediction horizon has a first temporal length and a first plurality of set points. The second prediction horizon has a second temporal length and a second plurality of set points. The asset controller is configured to constrain the second trajectory based on the first plurality of set points.

20 Claims, 17 Drawing Sheets

(51) Int. Cl.
*H02J 3/00* (2006.01)
*H02J 3/38* (2006.01)

(52) U.S. Cl.
CPC .............. *G06Q 50/06* (2013.01); *H02J 3/004* (2020.01); *H02J 3/381* (2013.01); *H02J 2203/10* (2020.01); *H02J 2203/20* (2020.01)

(56) References Cited

U.S. PATENT DOCUMENTS

| | | | |
|---|---|---|---|
| 9,063,525 | B2 | 6/2015 | Sanders et al. |
| 9,300,137 | B2 | 3/2016 | Cherian et al. |
| 9,417,276 | B1 | 8/2016 | Tatcho et al. |
| 9,500,717 | B1 | 11/2016 | Salmani et al. |
| 9,762,060 | B2 | 9/2017 | Kalsi et al. |
| 9,886,014 | B2 | 2/2018 | Yoo et al. |
| 10,061,283 | B2 | 8/2018 | Wong et al. |
| 10,892,638 | B2 | 1/2021 | Martinez et al. |
| 10,903,650 | B2 | 1/2021 | Martinez et al. |
| 10,971,931 | B2 | 4/2021 | Martinez |
| 11,451,088 | B2 | 9/2022 | Martinez et al. |
| 11,616,365 | B2 | 3/2023 | Martinez |
| 11,664,678 | B2 | 5/2023 | Martinez et al. |
| 11,942,782 | B2 | 3/2024 | Martinez et al. |
| 2004/0257858 | A1* | 12/2004 | Mansingh ................ H02J 3/00 365/154 |
| 2004/0260489 | A1* | 12/2004 | Mansingh ................ H02J 3/00 702/60 |
| 2006/0047369 | A1 | 3/2006 | Brewster et al. |
| 2007/0124026 | A1 | 5/2007 | Troxell et al. |
| 2008/0074284 | A1 | 3/2008 | Edwards et al. |
| 2008/0120216 | A1 | 5/2008 | Saigh et al. |
| 2008/0168092 | A1 | 7/2008 | Boggs et al. |
| 2008/0243713 | A1 | 10/2008 | Chiulli et al. |
| 2008/0288419 | A1 | 11/2008 | Miles et al. |
| 2009/0157835 | A1 | 6/2009 | Thompson et al. |
| 2010/0207456 | A1 | 8/2010 | Lasseter et al. |
| 2011/0035073 | A1 | 2/2011 | Ozog |
| 2011/0093127 | A1 | 4/2011 | Kaplan |
| 2012/0005505 | A1 | 1/2012 | Tolia et al. |
| 2012/0047060 | A1 | 2/2012 | Fossler, II |
| 2012/0239215 | A1 | 9/2012 | Timbus et al. |
| 2012/0271470 | A1 | 10/2012 | Flynn et al. |
| 2013/0166084 | A1 | 6/2013 | Sedighy et al. |
| 2013/0226360 | A1 | 8/2013 | Wilkins et al. |
| 2013/0338843 | A1 | 12/2013 | Iravani et al. |
| 2014/0074756 | A1 | 3/2014 | Chiulli et al. |
| 2014/0306533 | A1 | 10/2014 | Paquin et al. |
| 2015/0046345 | A1 | 2/2015 | Hakim et al. |
| 2015/0067356 | A1 | 3/2015 | Trichy Ravi et al. |
| 2015/0134130 | A1 | 5/2015 | Carralero et al. |
| 2015/0277406 | A1 | 10/2015 | Maturana et al. |
| 2015/0309829 | A1 | 10/2015 | Hiltgen et al. |
| 2016/0109895 | A1 | 4/2016 | Schindler |
| 2016/0117657 | A1 | 4/2016 | Forbes, Jr. et al. |
| 2016/0180474 | A1 | 6/2016 | Steven et al. |
| 2016/0190805 | A1 | 6/2016 | Steven et al. |
| 2016/0195866 | A1* | 7/2016 | Turney ................... G05B 23/02 700/291 |
| 2016/0197476 | A1 | 7/2016 | Stewart |
| 2016/0363948 | A1 | 12/2016 | Steven et al. |
| 2017/0102162 | A1 | 4/2017 | Drees et al. |
| 2017/0103468 | A1 | 4/2017 | Orsini et al. |
| 2017/0243305 | A1 | 8/2017 | Yoo et al. |
| 2018/0026445 | A1 | 1/2018 | Kalsi et al. |
| 2018/0075548 | A1 | 3/2018 | Madonna et al. |
| 2018/0088616 | A1 | 3/2018 | Aggarwal et al. |
| 2018/0115160 | A1 | 4/2018 | Tuladhar et al. |
| 2018/0262010 | A1 | 9/2018 | Kato et al. |
| 2018/0269687 | A1 | 9/2018 | Ghaemi et al. |
| 2018/0358810 | A1* | 12/2018 | Dong ..................... G05B 15/02 |
| 2018/0366978 | A1 | 12/2018 | Matan et al. |
| 2019/0033801 | A1 | 1/2019 | Baone et al. |
| 2019/0036339 | A1 | 1/2019 | Wong et al. |
| 2019/0044333 | A1 | 2/2019 | Martinez et al. |
| 2019/0044378 | A1 | 2/2019 | Martinez et al. |
| 2019/0079473 | A1 | 3/2019 | Kumar et al. |
| 2019/0109895 | A1 | 4/2019 | Power et al. |
| 2019/0158314 | A1 | 5/2019 | Choi et al. |
| 2019/0173286 | A1 | 6/2019 | Ilic et al. |
| 2019/0195526 | A1* | 6/2019 | Drees ..................... F24F 5/0017 |
| 2019/0392534 | A1 | 12/2019 | Takeuchi et al. |
| 2020/0083713 | A1 | 3/2020 | Dall'Anese et al. |
| 2020/0153246 | A1 | 5/2020 | Martinez |
| 2020/0175617 | A1 | 6/2020 | Martinez |
| 2021/0175744 | A1 | 6/2021 | Martinez et al. |
| 2023/0216299 | A1 | 7/2023 | Martinez |
| 2023/0275456 | A1 | 8/2023 | Martinez et al. |

FOREIGN PATENT DOCUMENTS

| | | |
|---|---|---|
| EP | 3002848 A1 | 4/2016 |
| JP | 2005-130550 A | 5/2005 |
| JP | 2014-505457 A | 2/2014 |
| JP | 2018-514850 A | 6/2018 |
| KR | 1020150117085 A | 10/2015 |
| KR | 1020170028699 A | 3/2017 |
| WO | 2016200398 A1 | 12/2016 |
| WO | 2019141511 A1 | 7/2019 |

OTHER PUBLICATIONS

International Searching Authority—International Search Report and Written Opinion for International Patent Application No. PCT/US2019/061321, mailed Mar. 10, 2020 (16 pages).

International Searching Authority—International Search Report and Written Opinion for International Patent Application PCT/US2018/045176, mailed Oct. 16, 2018, 13 pages.

International Searching Authority—International Search Report and Written Opinion for International Patent Application PCT/US2018/045275, mailed Oct. 19, 2018, 19 pages.

International Searching Authority—International Search Report and Written Opinion for International Patent Application PCT/US2018/064332, mailed Feb. 19, 2020, 15 pages.

International Searching Authority—International Search Report and Written Opinion for International Patent Application No. PCT/US2021/65778, mailed Mar. 29, 2022 (19 pages).

Ruggeri—"Centralised and decentralised control of active distribution systems: models, algorithms and applications", 2014 [retrieved on Jan. 29, 2021]. Retrieved from the internet, 86 pages https://pdfs.semanticscholar.org/d898/fec6fae3729b603b74c0d24576bd53ebc784.pdf? entire document, 150 pages.

Ryan Hledik and Jim Lazar, "Distribution System Pricing With Distributed Energy Resources", May 2016, Future Electric Utility Regulation, Report No. 4, 103 pages. (Year: 2016).

Wang et al.—"Frequency-adaptive grid-virtual-flux synchronization by multiple second-order generalized integrators under distorted grid conditions", Turkish Journal of Electrical Engineering and Computer Sciences, Jul. 9, 2015, vol. 23, Issue 6, pp. 1930-1945, [retrieved on Jan. 29, 2020]. Retrieved from the internet, http://journals.tubitak.gov.tr/elektrik/issues/elk-15-23-6/elk-23-6-29-1404-265.pdf entire document.

Notice of Reasons for Refusal for Japanese Patent Application No. 2021-531875, dated Oct. 24, 2023, 7 pages.

European Patent Office, Extended European Search Report for Application No. 21916535.4, dated Jun. 28, 2024, 8 pages.

* cited by examiner

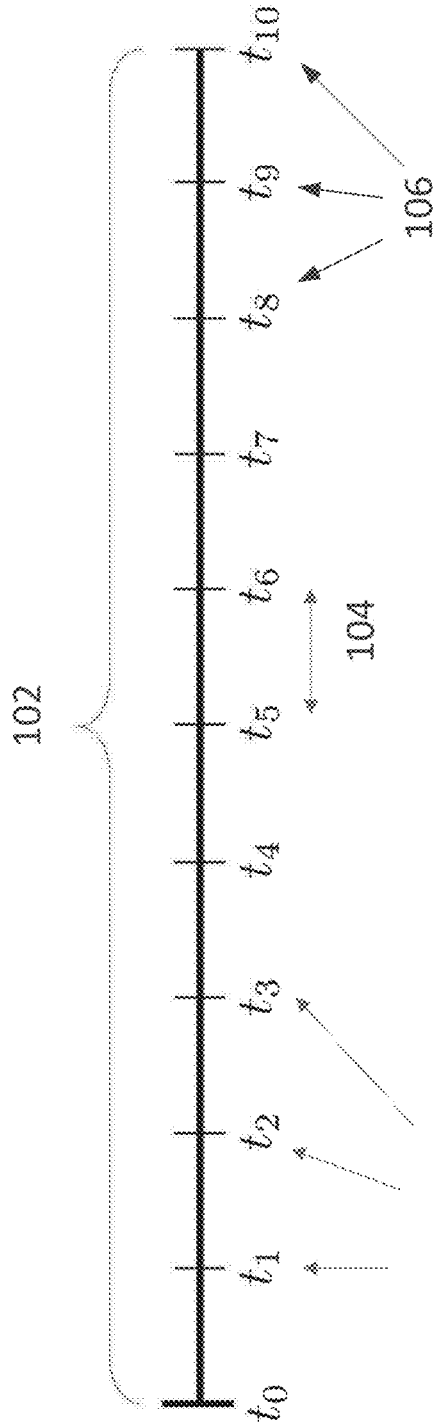
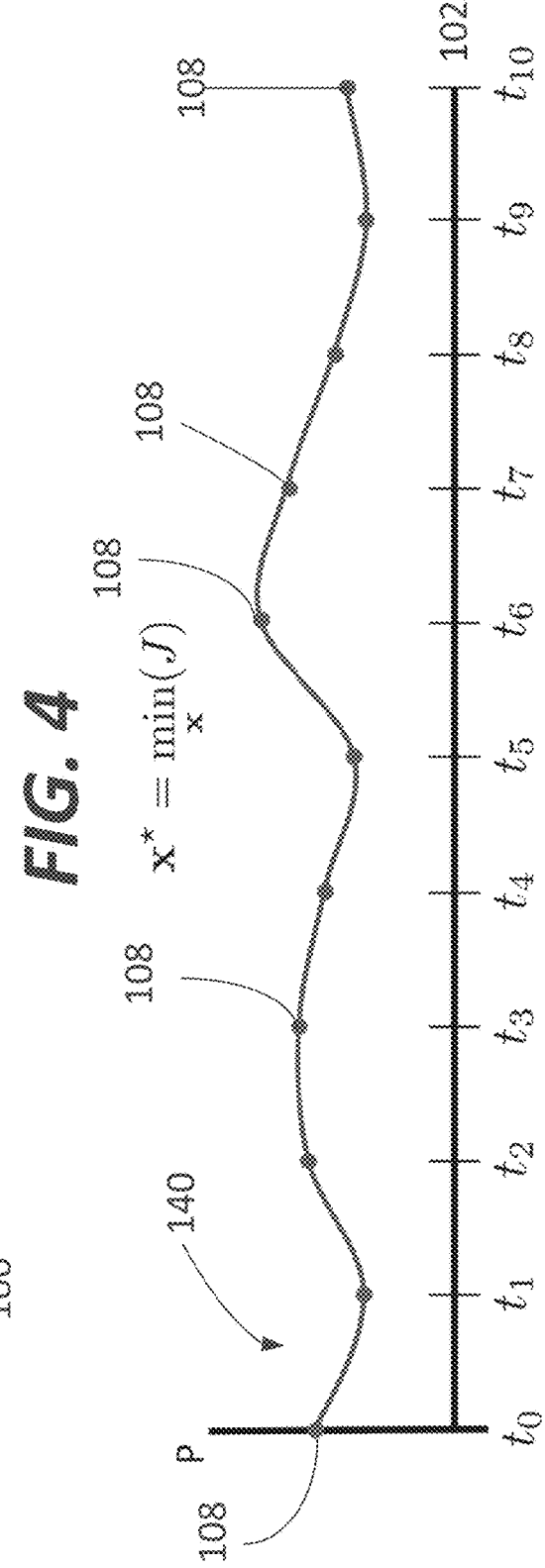
FIG. 4
FIG. 5

OPTIMIZATION CONTROLLER FOR DISTRIBUTED ENERGY RESOURCES

PRIORITY

This patent application claims priority from provisional U.S. patent application No. 63/131,968, filed Dec. 30, 2020, entitled, "DECENTRALIZED ALGORITHMS FOR DER COORDINATION," and naming Jorge Elizondo Martinez, Seth Calbert, Trudie Wang, and Shuyang Li as inventors, the disclosure of which is incorporated herein, in its entirety, by reference.

FIELD OF THE INVENTION

Illustrative embodiments of the invention generally relate to control of a distributed energy resource within power distribution networks and, more particularly, the various embodiments of the invention relate to methods for optimizing power exchange in a distributed energy resources system.

BACKGROUND OF THE INVENTION

The electricity grid connects homes, businesses, and other buildings to central power sources. This interconnectedness requires centralized control and planning, where grid vulnerabilities can cascade quickly across the network. To mitigate these risks, aggregated distributed energy resources ("DERs") systems ("DERs Systems"), such as microgrids are becoming a popular solution. Microgrids include controlled clusters of electricity generation and storage equipment, as well as loads that provide a coordinated response to a utility need and can also operate disconnected from the main grid. This increases the power system efficiency and reliability.

The US Department of Energy provides a formal definition of a microgrid as a group of interconnected assets, including loads and distributed energy resources, with clearly defined electrical boundaries that acts as a single controllable entity with respect to the grid. A microgrid often has distributed generators (e.g., diesel generators, gas turbines, etc.), batteries, as well as renewable resources like solar panels or wind turbines.

SUMMARY OF VARIOUS EMBODIMENTS

In accordance with one embodiment of the invention, a method controls a distributed energy resource. The method obtains a model of a distributed energy resource or a system of distributed energy resources. The method determines a first trajectory of desired power output or a state of the distributed energy resource over the course of a first prediction horizon by minimizing a cost function associated with the DER model. The first prediction horizon has a first temporal length and a first plurality of set points. The method determines a second trajectory of desired power output or a state of the distributed energy resource over the course of a second prediction horizon by minimizing a cost function associated with the DER model. The second prediction horizon has a second temporal length and a second plurality of set points. The method constrains the second trajectory as a function of the first plurality of set points or states. The first temporal length is greater than the second temporal length. A time interval between sampling times in the first trajectory is greater than the time interval between sampling times in the second trajectory.

In some embodiments, the method also determines a third trajectory of desired power output of the distributed energy resource over the course of a third prediction horizon by minimizing the cost function associated with the DER model. The third prediction horizon has a third temporal length and a third plurality of set points. The method may constrain the third trajectory based on the first plurality of set points and the second plurality of set points. The second temporal length may be greater than the third temporal length. A time interval between sampling times in the second trajectory may be greater than the time interval between sampling times in the third trajectory.

In various embodiments, a plurality of asset managers may independently solve their own optimization trajectory in a distributed and decentralized manner. A model predictive control routine may be used to recalculate the first trajectory, the second trajectory, and/or the third trajectory.

Among other things, the distributed energy resource may be part of an HVAC system. In some embodiments, the distributed energy resource may be a battery.

In accordance with another embodiments, a method controls a distributed energy resource. The method receives a request for power from a distributed energy resources system. The method uses a model predictive control routine and an asset model to calculate a first predicted operational trajectory as a function of a current operational state of the distributed energy resource. The at least one predicted operational trajectory has a first prediction horizon and a plurality of timeslots along the prediction horizon where the model is solved and optimized. The method also uses MPC routine an the asset model to calculate a second predicted operational trajectory as a function of a current operational state of the distributed energy resource. The second predicted operational trajectory has a second prediction horizon that is temporally shorter than the first prediction horizon. The second predicted operational trajectory has a second plurality of timeslots along the second prediction horizon where the model is solved and optimized. The time interval between timeslots in the second predicted operational trajectory is temporally shorter than the time interval between timeslots in the first predicted operational trajectory.

In accordance with yet another embodiments, an asset manager is configured to control distribution of power within an aggregated distributed energy resources system ("DERs system") having a plurality of assets. The asset manager is configured to solve a given asset model. The asset manager includes an asset model configured to model a real asset, and an interface configured to communicate with at least one other asset manager and/or a central controller in the DERs system. The interface is configured to receive asset information relating to the real asset. An asset controller is configured to optimize a setpoint of the asset by determining a first trajectory over the course of a first prediction horizon and a second trajectory over the course of a second prediction horizon. The trajectories are determined by minimizing a cost function associated with a DER model or a DERs system model. The first prediction horizon has a first temporal length and a first plurality of set points. Similarly, the second prediction horizon has a second temporal length and a second plurality of set points. The asset controller is configured to constrain the second trajectory based on the first plurality of set points. The first temporal length is greater than the second temporal length. A time interval between sampling times in the first trajectory is greater than the time interval between sampling times in the second trajectory. The asset manager is further configured to control the real asset in accordance with the set points determined by the optimization.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 4 schematically shows a prediction horizon in accordance with illustrative embodiments of the invention.

FIG. 5 schematically shows a control trajectory over a given prediction horizon in accordance with illustrative embodiments of the invention.

DESCRIPTION OF ILLUSTRATIVE EMBODIMENTS

In illustrative embodiments, a distributed energy resources system has one or more controllers that work together to control power inputs and outputs into one or more assets. Control of the various assets is based on an optimization algorithm that accounts for both fast and slow system dynamics. To that end, the controller receives a mathematical model that provides realistic and real-time results for one or more simulated asset models in an aggregated distributed energy resources system ("DERs system"). Each of the asset models has an underlying mathematical representation of the behavior of a given real asset and/or the DERs system. The controller implements a model predictive control (MPC) routine to run an optimization algorithm for slow system dynamics. The points (e.g., endpoints) determined from the MPC for the slow system dynamics are nested as constraints in an optimization algorithm for faster system dynamics (which may also be an MPC routine). In various embodiments, each of the one or more asset managers solve their respective asset model and control their corresponding asset in accordance with the optimization. The asset is then run in accordance with the setpoint determined by the optimization. Details of illustrative embodiments are discussed below.

Figure 1A:
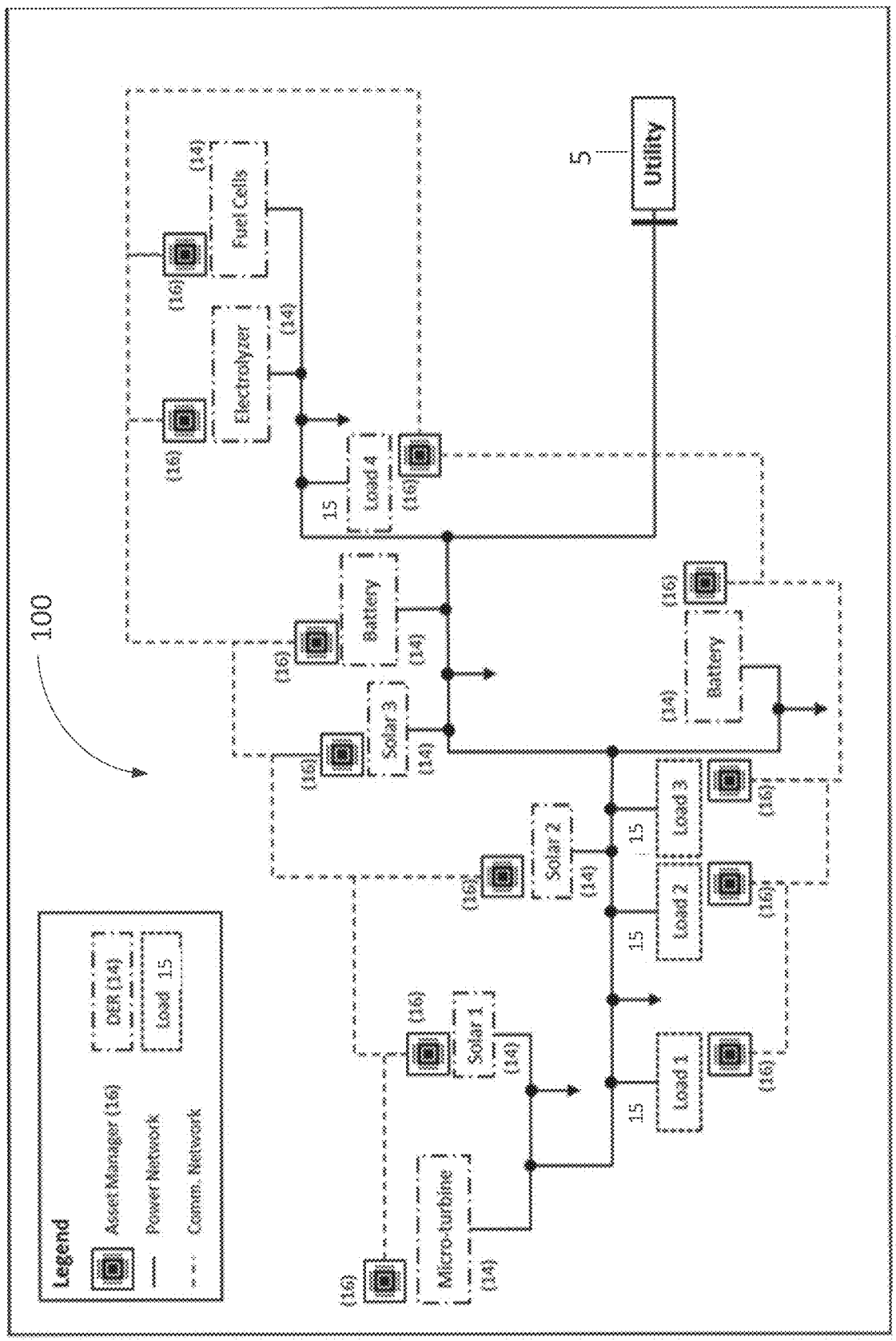
FIG. 1A schematically shows a DERs system including asset managers that are used to optimize the operation of a plurality of distributed energy resources and loads to fulfill a system-wide objective in accordance with illustrative embodiments of the invention.

FIG. 1A schematically shows a DERs system 100 including asset managers 16 that are used to optimize the operation of a plurality of distributed energy resources (DER) 14 and loads 15 to fulfill a system-wide objective in accordance with illustrative embodiments of the invention. As known by those of skill in the art, the DER 14 exchanges real and reactive power with the power network. In contrast, the load 15 generally consumes or uses real and reactive power. The DER 14 may be, among other things, solar, micro-turbine, battery, fuel cells, electrolyzer, etc. Although there are distinctions between loads 15 and DERs 14, together both loads and DERs may be referred to as assets 14.

Figure 2:
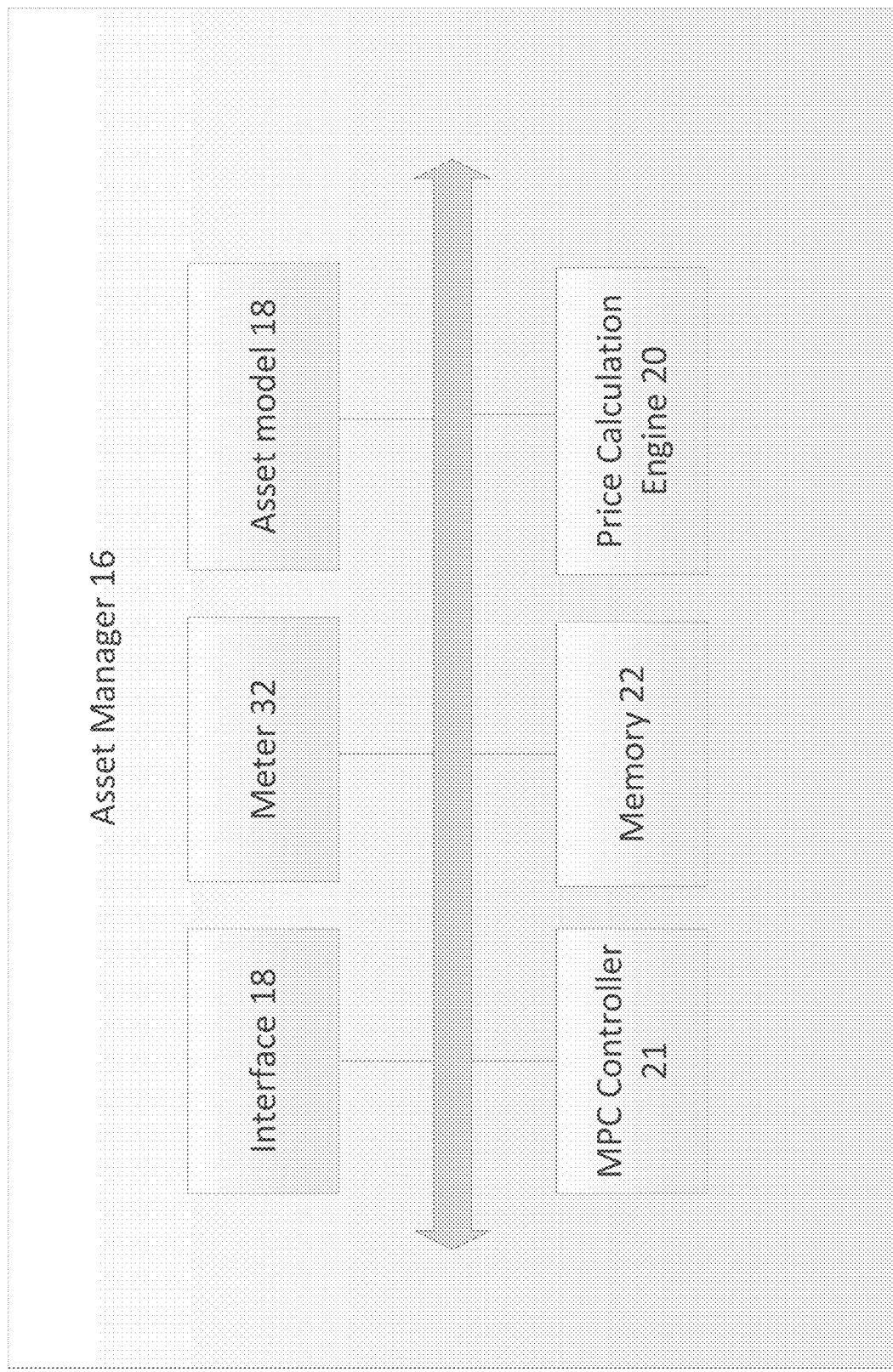
FIG. 2 schematically shows an asset manager of FIG. 1 configured in accordance with illustrative embodiments of the invention.

In some embodiments, each of the assets 14 is controllable by a given asset manager 16 (asset manager 16 described in additional detail with respect to FIG. 2). Additionally, or alternatively, a plurality of the DERs 14 may be controlled by a single asset manager 16. However, in some embodiments, one or more DERs 14 and/or loads 15 may not be coupled with the asset manager 16. In illustrative embodiments, each asset manager 16 also contains an asset model 18 (also referred to as a virtual asset 18) configured to simulate the real asset. However, it should be understood that illustrative embodiments may have one or more asset managers 16 connected to the network 100, and each manager 18 may have one or more asset models 18. Furthermore, each asset model 18 may model a different type of asset (e.g., a battery, solar panels, wind turbine, etc.). Although not shown, illustrative embodiments may include one or more real assets connected to the network 12 in addition to the model 18.

Figure 1B:
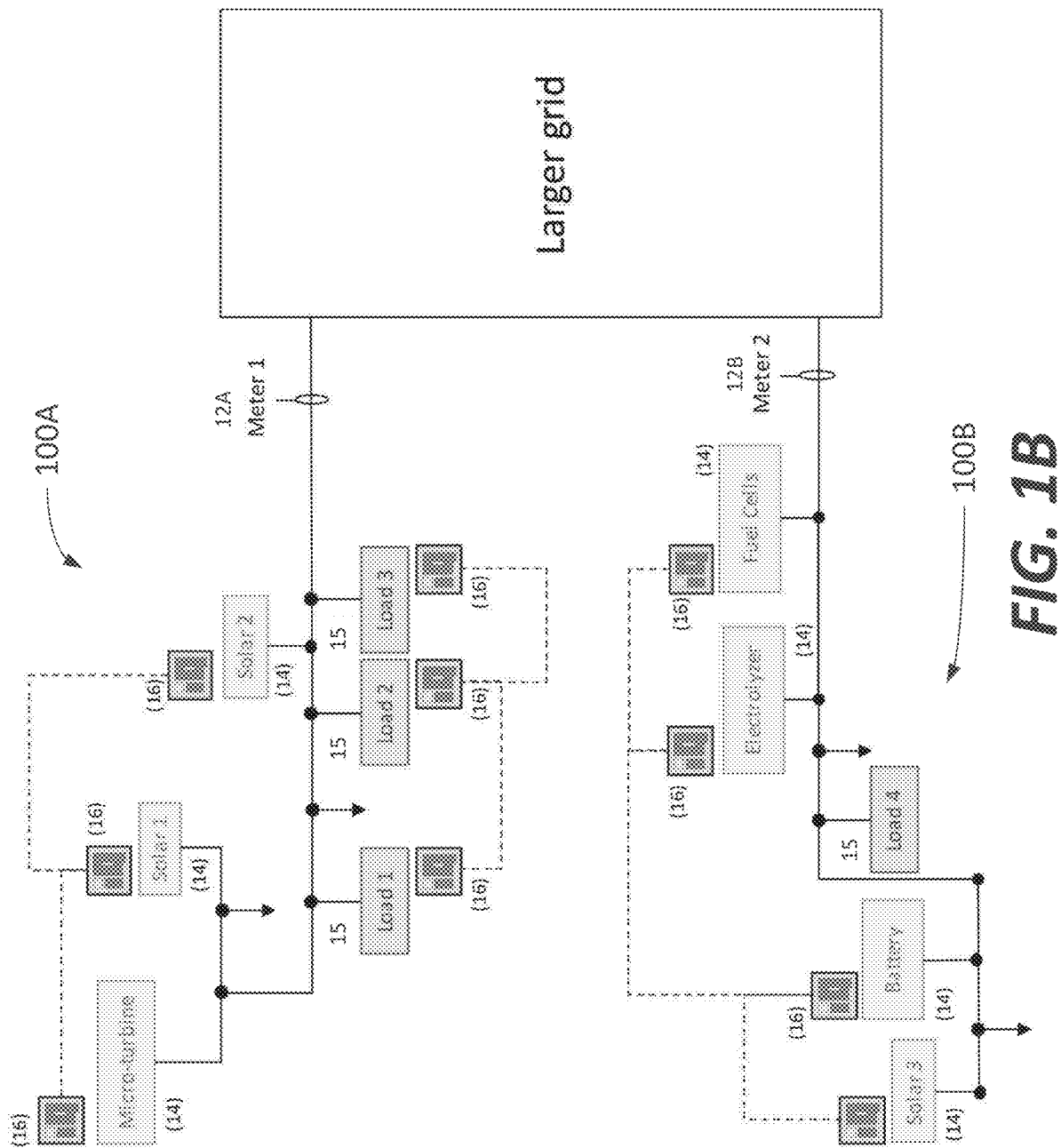
FIG. 1B schematically shows two DERs networks in accordance with illustrative embodiments of the invention.

FIG. 1B schematically shows two DERs networks 100A and 100B. Each of the networks 100A and 100B has a branch of common coupling 12A and 12B. A virtual branch of common coupling may be calculated for two independent DERs systems 100A and 100B in accordance with illustrative embodiments of the invention. The virtual branch of common coupling is formed by combining meter information from the branches of common coupling 12 of two or more independent aggregated DERs systems 100A and 100B (e.g., 12A and 12B). For example, the real power at the virtual branch of common coupling is the sum of real power measured by meter 1 at the branch of common coupling 12A and the real power measured by meter 2 at the branch of common coupling 12B. Accordingly, any discussion relating to the branch of common coupling 12 also applies to the virtual branch of common coupling unless the context otherwise requires.

As discussed below, in various embodiments, one or more of the DERs systems 100A and 100B may be controlled using a decentralized approach. In other embodiments, the DERs systems may be controlled using a centralized approach.

DERs systems 100 (e.g., microgrids) are deployed across the world in a global effort to modernize power systems and make them more sustainable, resilient and efficient. Various embodiments provide a distributed architecture where every consumer can be a producer and proactively participate in power procurement, utilization and dispatch. As the number of stakeholders in the energy infrastructure increases, a problem arises in determining the role of utilities and how to handle trade-offs between the individual and the collective goals of the grid.

Illustrative embodiments provide an end-to-end solution that converts DERs into intelligent agents that interact and create systems with emergent behavioral properties that meet the collective needs of the system 100. Illustrative embodiments achieve this by using local control and decentralized optimization techniques, which leverage concepts from game theory, distributed optimization methods and machine learning.

Illustrative embodiments allow the DERs 14 to be the fundamental building block of the grid and create systems 100 from the ground up by having DERs 14 interact and coordinate. DERs systems 100 are built organically and scale as the needs of the system 100 changes, providing resilience and flexibility to accommodate inevitable changes like the addition of intermittent renewable generation, the electrification of transportation with EVs, and the introduction of novel storage technologies.

When it comes to managing the DERs system 100, there are two general approaches:

Centralized top-down approach: A single controller, typically located away from the DERs, collects information and data from all assets in the system. The centralized controller processes it and calculates the optimal dispatch strategy for each DER 14 in order to achieve a common goal.

Decentralized, bottom-up approach: Control is collocated with each DERs to provide each DER 14 with decision-making capabilities so that the DERs system 100 goal can be obtained by the collaboration of the different DERs 14 and loads 15. A distributed/decentralized system enables assets 14 to share data and resources more efficiently by exchanging less overall information and by limiting the scope of objectives and constraints.

The centralized approach undesirably requires complex data to flow up and down the system hierarchy, and has a single point of data processing and decision-making. As the number of variables and nodes increases, the problem becomes overly complex. Furthermore, the associated latencies and delays caused by the communication network can have an impact on the performance of DERs 14 of illustrative embodiments. These limitations have led to the abundance of "pilot projects" unable to scale beyond niche applications, and typically with high costs.

In contrast, the inventors have determined that decentralized control of the assets 14 is inherently easier to scale and represents a more natural way to construct DERs systems 100. Advantages of the decentralized approach include:

1) Intelligence that grows as the system grows. Every time an agent (DER or controllable device) is installed in the grid, a new point of data processing and decision-making is added, so that the system capabilities increase over time.
2) Simple message exchange. Because decisions are local on an agent-by-agent basis, the messages that need to be communicated are much simpler and can be done peer-to-peer. For example, no single agent 16 needs to have information regarding the energy available in every battery in the system 100.
3) System architecture agnostic. More DERs and stakeholders lead to a larger diversity of configurations that need to be catered for, something that decentralized algorithms can easily adapt to as the local decisions are only indirectly affected by other agents or their location.
4) Rapid response. Autonomous DERs are able to respond rapidly and efficiently to local situations that impact the larger grid, balancing the system before problems escalate to cause larger system-wide events that a system operator (such as an ISO) needs to respond to.
5) Technology agnostic. Agents can hide the complexity of their underlying DER, making a level playing field for any type of energy storage, generation or load control.

To illustrate the inherent scalable nature of the decentralized approach, consider a system of N DERs 14, in which an algorithm determines which DERs 14 should be running and which ones should be in standby for optimal performance. This issue is typically encountered in systems as DERs 14 need to receive a start or a stop command to be in the correct state. This is a typical mixed-integer linear programming optimization problem In the centralized approach, the unique control agent (e.g., the central controller) takes information from all DERs 14 and decide between $2^N$ system configurations. The problem scales exponentially with the number of DERs 14, which means that even if an algorithm can perform well in a small system of 2-3 DERs it might not do it in a larger system of 10 assets, much less a large fleet of thousands.

In various embodiments, the decentralized algorithms tackle this problem by allowing each DER 14 to decide between just two states: on or off, based in its local information and a few variables shared within the system. The complexity of the problem does not increase significantly with the number of DERs, because each additional DER automatically adds another decision-maker.

The inventors have determined that despite the theoretical desirability of distributed and decentralized control algorithms, there are significant challenges to bringing the decentralized control algorithms into practice. The inventors developed a method for widespread DER adoption that simultaneously meet the needs of each individual user's unique physical and economic contexts, while also meeting the needs of the larger grid.

In various embodiments, the method involves predicting operational trajectories of the DER 14 using a receding horizon control routine in the form a model predictive control (MPC) routine. The control trajectory is calculated using an MPC algorithm based on the actual state of the DER 14. MPC algorithms take constraints on the system variables directly into account and can thereby advantageously be used to find optimal operational trajectories within safe operational limits, not just for the current control set-points, but also for future set-points, thus forming a schedule of set points.

Specifically, a controller implements an MPC routine that is configured to receiving a current operational state of the DER 14 (e.g., a micro-turbine). Based on the current operational state of the DER 14, one or more predicted operational trajectories are calculated including at least one predicted operational trajectory, which may include a power output set-point.

Model predictive control is a control method that makes use of a model of the process to obtain the control signal by minimizing an objective function (e.g., the cost function) over a finite receding horizon. In various embodiments, the process model is used to predict the future DER states and outputs, based on past and current values and on the proposed optimal future control actions. These actions are calculated by the controller taking into account the cost function, the states and the constraints. In other words, the controller produces a control signal that minimizes the cost function over the prediction horizon. Undesirably, computational burden on the controller grows rapidly with the increases in the prediction horizon, increases in sampling rate, and increases in the number of DERs being modeled. The inventors determined that one or more DERs may be optimized while reducing large computational burden by nesting two or more optimization functions, as is described in greater detail below.

Figure 1C:
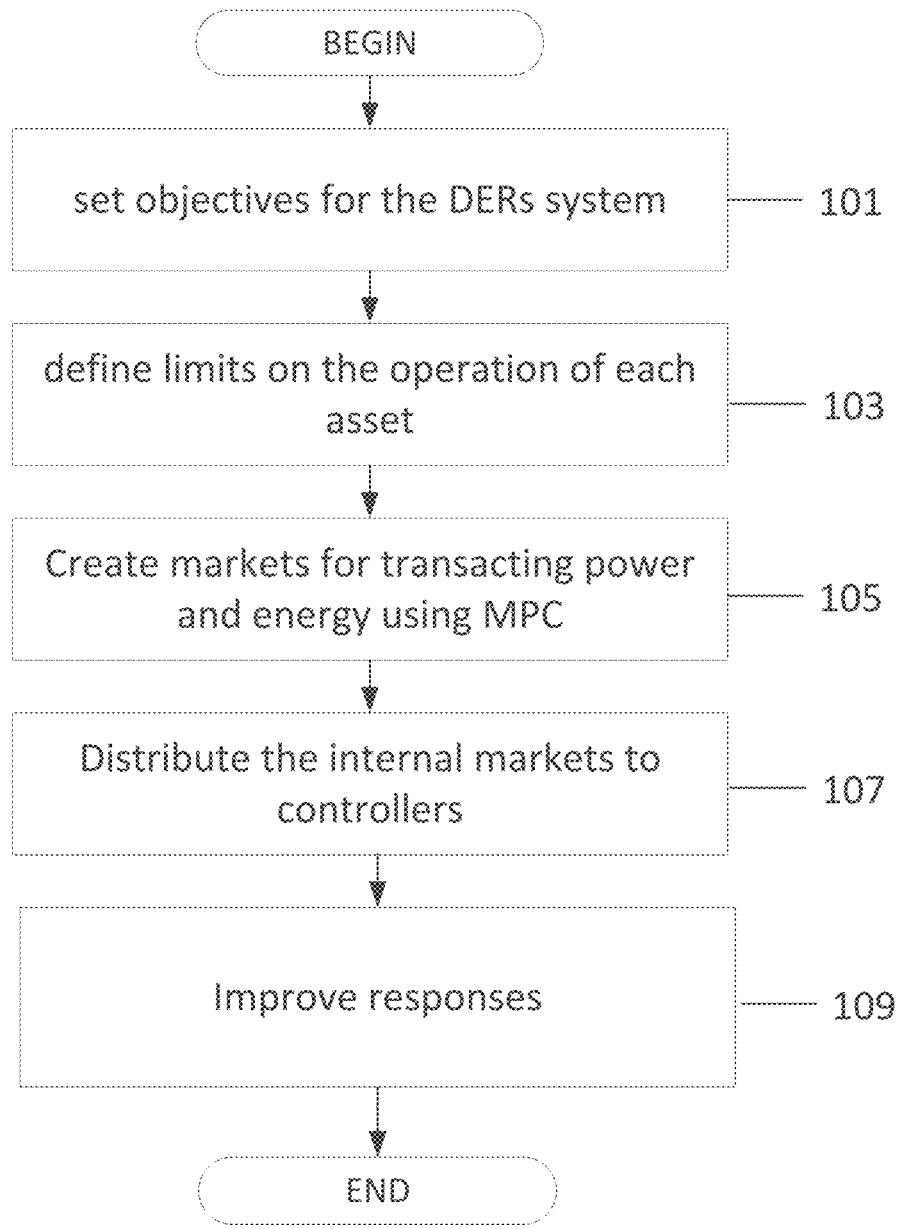
FIG. 1C schematically shows a process of executing a decentralized algorithm in accordance with illustrative embodiments of the invention.

FIG. 1C schematically shows a process of executing a decentralized algorithm in accordance with illustrative embodiments of the invention. It should be noted that this method is substantially simplified from a longer process that may normally be used. Accordingly, the method shown in FIG. 1C may have many other steps that those skilled in the art likely would use. In addition, some of the steps may be performed in a different order than that shown, or in parallel. Furthermore, some of these steps may be optional in some embodiments. Accordingly, the process is merely exemplary of one process in accordance with illustrative embodiments of the invention. Those skilled in the art therefore can modify the process as appropriate.

The process begins at step 101, which sets objectives for the DERs system 100. Each asset 14 may be behind its own meter. Each asset 14 may be associated with a corresponding asset manager 16 that tracks the various details of the asset. In accordance with its local cost function, each asset 14 may coordinate to provide a certain function to the local utility. Accordingly, each asset may receive a local optimization cost function, and an overall system optimization cost function. Optimizing the operation of each asset 14 is a complicated problem because each DER has to meet local objectives and constraints, for example:

Minimizing the electric bill according to the local rate and export restrictions.
Extending the life of the equipment depending for the technology being used.
Accounting for local resilience needs that depends on customer expectations.

In various embodiments, each asset 14 optimizes its own objectives locally and is then incentivized to deviate from that local optimization so that the system 100 can meet a request from the utility. This scheme adapts to more or less participants in the system 100 by changing the incentive amount.

The process proceeds to step 103, which defines limits on the operation of each asset 14. The decentralized interaction between the assets 14 results in an environment where assets 14 can change their output freely to meet their own objectives and the global system objectives. However, for a safe operation of actual projects, various embodiments place bounding limits within that freedom, given by physical and regulatory constraints.

Illustrative embodiments provide algorithms that instruct the individual asset to first protect itself, keeping the first layer of protection local. Global constraints are also easily incorporated as soft limits based on incentives, and then, only when necessary, as hard limits by simple adjustments to the restrictions in an area.

Because of this division of responsibility, the system 100 can effectively and quickly prepare for and recover from over or under-supplies of energy, enabling fleets of DERs to collectively observe protection and recovery modes smoothly and automatically.

The process then proceeds to step 105, which creates markets for transacting power and energy using MPC combined with a distributed control and optimization. Illustrative embodiments provide algorithms that simultaneously manage both short-term (e.g., second-by-second) intermittencies, and longer-term (e.g. daily and weekly) variations in load or generation. The interaction between the DERs resembles a market where a commodity of interest has a price and each DER decides how much to supply (or take) depending on its specific characteristics. The two markets that arise from the fast and slow system dynamics are fundamentally different:

Power Market: (second-by-second) The interactions to react to fast intermittency leads to a market where the commodity of interest is electric power. For example, if there is a sudden connection or disconnection of a large load, the DERs are incentivized to immediately react by providing the required power, and a few seconds later the system is again in equilibrium at the desired operating point.

Energy Market: (hours to days) The interactions to react for slower variations makes the commodity of interest a unit of electric energy. For instance, in a day when consumption is significantly increased, the energy market incentivizes the storage devices to prepare by charging beforehand, and incentivize a generator resource to come online.

In both markets, incentives are used to achieve a goal, rather than the typical command found in traditional control and optimization systems. By letting each DER make its own decision and balance between the two markets, DER system 100 operational objectives can be achieved seamlessly without the need of a centralized dispatch authority.

The two markets are interrelated to create a unique system response. In the energy market, the DERs system 100 builds consensus on the optimal energy allocation throughout one or more days, which results in a schedule for each DER energy import or export, plus a schedule for important state variables (for example, state of charge for batteries).

After a schedule from the energy market is established, the schedule is sent to the power market in order to communicate and achieve a combined optimal resource use strategy. DERs in the power market bid together a small data payload second-by-second. The power market maintains the system in the optimal course in between the scheduled energy points, thereby responding immediately to events and keeping the system in optimal balance and operation. In this way, the power market ensures optimal operation within limits and enables fine-granularity life extension techniques for DERs.

The process then proceeds to step 107, which distributes the internal markets to various controllers 16. In typical implementations of distributed algorithms, the markets require a central agent that acts as a "coordinator" or "market operator" whose task is to calculate the prices of the commodities by monitoring if there is a lack or excess. Even though the central agent makes no dispatch decisions, the scheme has several disadvantages since it (a) requires an authority to define who the central agent is, (b) needs all other agents to trust the central agent, and (c) has a single point of failure and vulnerability.

Illustrative embodiments provide several ways to run the above markets without the need of coordinators, achieving complete symmetry among all the agents. That is, no agent performs a task that is not also performed by all other agents. The details of four of the algorithms can be found in commonly owned patent application "Distributed and Decentralized DER System Optimizations," published as US20200175617A1, which is incorporated herein by reference in its entirety. Certain steps of the price calculation can be split among the agents and then consensus reached in a matter of seconds, adding reliability and modularity to the market itself.

The process then proceeds to step 109, which improves responses. In illustrative embodiments, for market operation, DERs 14 have to correctly respond to incentives. Illustrative embodiments leverage past operational data to adjust learned parameters and improve those responses over time. There are four ways in which Illustrative embodiments uses this data to improve the DER response:

Forecasting: Accurate forecasts are essential in any system that has renewable resources and energy storage capabilities, as the value of energy and power changes over time. In order to reach consensus for the schedule (energy market) and the actual dispatch signal (power market), the price of the commodity should be considered not only at the present time but also the expected value in the future. The energy market uses forecasting to plan resource allocation ahead of time, while the power market prepares a response seconds in advance to compensate for DERs reaction times, ramp rates and start-up delays. This look-ahead allows the power market to ensure that restrictions such as transformer rated limits and no-export regulations can be met while simultaneously optimizing resource usage.

Efficiency calculation: Understanding the true operational efficiency of DERs allows robust energy optimization. By using data collected during operation, both power and energy markets can leverage knowledge of which operational points are better for a given DER and under what conditions.

Repose characteristic: Knowledge of a DER's output response to a given set-point is used for managing the system operating point through expected and unexpected changes in power flows. Illustrative embodiments learn and incorporate features including reaction time, overshoot, ramp rate, rise time, settling time, and any delays caused by starting up or shutting down procedures. An example of measured response characteristics for two different DERs is shown in the figure below.

Degradation estimation: By understanding the degradation effect of DER usage at different operational points, the power and energy markets can strike the proper balance between using a resource for economic gain and degrading it causing reduced operational life. For example, for a battery storage asset, optimal operation depends not only on understanding the current state of health (SoH) of the battery, but also the effect of cycling, power output level, state of charge (SoC) level and temperature on the SoH.

Various embodiments use model predictive control (MPC) to control the outputs of each asset while satisfying a set of constraints placed on the asset. The main advantage of MPC is that it allows the current timeslot to be optimized, while keeping future timeslots in account. This is achieved by optimizing a finite time-horizon, but only implementing the current timeslot and then optimizing again, repeatedly, thus differing from a linear-quadratic regulator (LQR). Also MPC has the ability to anticipate future events and can take control actions accordingly.

In effect, MPC provides a schedule of what the state variables (e.g., state of charge for batteries) should do right now and in the future within some time horizon.

MPC is a control policy that is used to run different optimization methods in the real world and it helps make optimization more robust and dynamic as it continuously reevaluates the estimations within the time-horizons and adjusts the schedule accordingly. If a notification of a future event is received, for example, that can be added into the forecast of states in the receding horizon to prepare an appropriate response over time.

The process then comes to an end.

FIG. 2 schematically shows an asset manager 16 of FIG. 1 configured in accordance with illustrative embodiments of the invention. As shown, the asset manager 16 of FIG. 2 has a plurality of components that together perform some of its functions. Each of these components is operatively connected by any conventional interconnect mechanism. FIG. 2 simply shows a bus communicating with each of the components. Those skilled in the art should understand that this generalized representation can be modified to include other conventional direct or indirect connections. Accordingly, discussion of a bus is not intended to limit various embodiments. The asset manager 16 of the present disclosure may include some or all of the components in the asset manager 16 described in U.S. Pat. Nos. 10,903,650, and 10,971,931, each of which is incorporated herein by reference in its entirety.

Indeed, it should be noted that FIG. 2 only schematically shows each of these components. Those skilled in the art should understand that each of these components can be implemented in a variety of conventional manners, such as by using hardware, software, or a combination of hardware and software, across one or more other functional components. For example, the controller may be implemented using a plurality of microprocessors executing firmware. As another example, the controller may be implemented using one or more application specific integrated circuits (i.e., "ASICs") and related software, or a combination of ASICs, discrete electronic components (e.g., transistors), and microprocessors. Accordingly, the representation of the controller and other components in a single box of FIG. 2 is for simplicity purposes only. In fact, in some embodiments, the controller of FIG. 2 is distributed across a plurality of different machines—not necessarily within the same housing or chassis.

The asset manager 16 includes an MPC controller 21 configured to, among other things, use local cost functions to manage operation of its asset(s) 14, and determine an operating point. For example, the operating branch of the asset 14 may be the combination of the real and reactive power that the asset 14 is injecting into the system 100. The operating point may also include all the internal states of the asset 14, such as temperatures, stored energy, voltages, etc.

The MPC controller 21 may be distributed among each asset 14. In some other embodiments, the MPC controller 21 may operate as a central controller. Regardless, the MPC controller performs an MPC optimization over a prediction horizon. In various embodiments, the MPC controller advantageously performs two or more MPC optimizations that are nested together, as discussed further below.

The asset manager 16 also includes an interface 18 to communicate with other assets 14 and/or other devices. For example, the interface 18 is configured to communicate with other asset managers 16 (e.g., to send and/or receive the price calculated by a price calculation engine 20 discussed below). Additionally, the interface 18 is configured to receive a system-wide objective. In illustrative embodiments, the system-wide objective may instruct the system 100 to provide a certain amount of real and/or reactive power to the utility 5 (e.g., the total output power of all of the assets 14 in the DERs system 100 should be 10 kWatts). Accordingly, compliance with the system-wide objective can be tracked by measuring the power at the branch of common coupling 12.

The asset manager 16 also includes the price calculation engine 20, which calculates the price that is sent to the other asset managers 16. For clarity, in some embodiments of the invention, a "price" or "price signal" is a signal generated in a coordinated DERs system 100 that increases in value when there is more demand than supply of energy and decreases when there is more supply than demand. For example, the demand for power can come from the loads 15 and/or the utility 5. Additionally, the supply can come from the assets 14 and/or the utility 5. It can also be dependent on other variables, such as reactive power and system losses. In some embodiments, the price can be calculated using the following cost function:

$$p_i^{(k+1)} = g_i(p_i^{(k)}, y_{out}, y_{sp})$$

Where $p_i^{(k)}$ is the price vector (or scalar) at time "k", $g_i$ is the price calculation function, $y_{out}$ are the values of the output variables that are being tracked, and $y_{sp}$ are the set-points for such variables.

Similarly, in some embodiments of the invention, a "response" is the determination of the real and reactive power outputs of the DER asset 14 obtained by minimizing a cost function of one or more of its variables with respect to power. In some illustrative embodiments, the cost function can take the form:

$$P_i^* = \min_{P_i} J_i(P_i, p_i, x_i, \Theta)$$

Where $P^*_i$ is the calculated optimal output power vector, $J_i$ is the cost function, $P_i$ is the output power variable over which we optimize, $p_i$ is the price signal described above, $x_i$ is a vector of the asset or plurality of asset states and important variables, and $\Theta$ is a vector of external variables that affect performance.

Additional discussion of cost functions and the price can be found in U.S. patent application Ser. Nos. 16/054,377, and 16/683,148, which are both incorporated herein by reference in their entireties.

The asset manager 16 may also include a memory 22 for storing asset 14 data, a function generator configured to produce a local cost function, and an asset model used to emulate the behavior of any asset, such as diesel generators, gas turbines, batteries, solar panels, wind turbines, loads, etc. Although the interface 18 may communicate with the asset 14 using a protocol that may be proprietary to the respective asset 14, it preferably communicates with the central controller and/or other asset managers 16 and/or other agents inside and outside the DERs system 100 using a communication protocol commonly found in DERs systems 100. Each of these components and other components cooperate to perform the various discussed functions.

It should be reiterated that the representation of FIG. 2 is a significantly simplified representation of an actual asset manager 16. Those skilled in the art should understand that such a device may have many other physical and functional components, such as central processing units, communication modules, protocol translators, sensors, meters, etc. Accordingly, this discussion is in no way intended to suggest that FIG. 2 represents all the elements of an asset manager 16.

In addition to the components described herein, the asset manager 16 may include other modules, such as a voltmeter, topography engine, physical characteristic analysis engine, or others, as described in U.S. application Ser. Nos. 16/054,377, 16/054,967, and/or 16/683,148, all of which are incorporated herein by reference in their entireties.

Figure 3C:
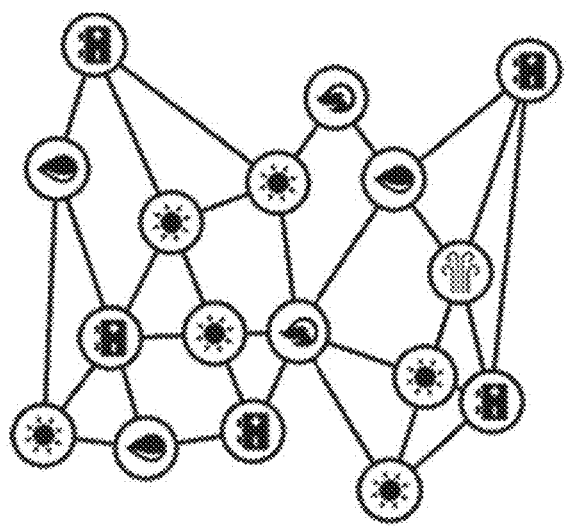
FIGS. 3A-3C schematically show three different schemes for optimization of the DERs system.
Figure 3B:
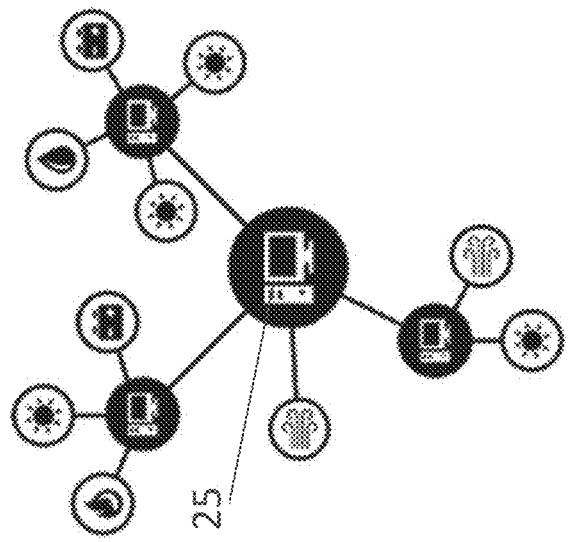
Figure 3A:
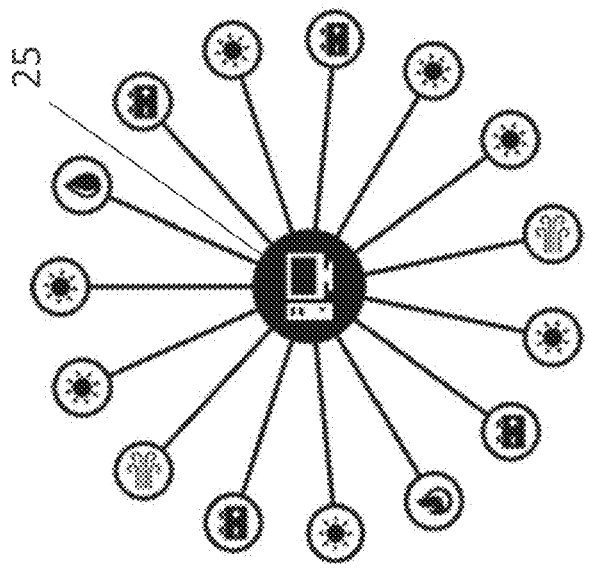

FIGS. 3A-3C schematically show three different schemes for optimization of the DERs system 100. In both FIGS. 3A and 3B a central controller 25 calculates the price and/or the set-point for the assets. FIG. 3A schematically shows a single centralized approach, where all the calculations, such as calculating set-points, are performed by the central controller 21 (also referred to as a central agent 25). FIG. 3B schematically shows a distributed approach, where the optimization is achieved through the implementation of the dual-decomposition method or some other distributed optimization approach. For the DERs system 100, the distributed approach is more scalable, modular, secure, and reliable than the fully centralized one shown in FIG. 3A. However, the distributed approach of FIG. 3B relies on a central agent to act as a coordinator and perform some tasks such as calculating the dual variables, also known as prices. Thus, in a distributed system, one or more nodes distribute work to sub-nodes.

The inventor recognized that the dual-decomposition shown in FIG. 3B has a number of disadvantages, namely:

Requires a central agent 25.

It has a single point of failure, as it only works if the central agent 25 is functional. For example, if the central controller 25 is down, the optimization of the system 100 does not function. Additionally, if the central controller 25 becomes compromised, the price sent to every asset is compromised.

Requires that every asset trust the central agent 25. For example, if the DERs system 100 spans a neighborhood where every asset 14 is with a different homeowner, it is difficult to determine which home owner should be the authority.

FIG. 3C schematically shows the system 100 where the price is calculated by one or more of the assets 14 in accordance with illustrative embodiments of the invention. A dedicated central agent 25 is not required. Thus, in various embodiments of the innovation, the need for a dedicated central agent is removed. In some embodiments, the decentralized system has nodes (e.g., assets 14 and/or asset managers 16) that communicate directly with other peers (e.g., instead of through a node/sub-node distributed arrangement).

FIG. 4 schematically shows a prediction horizon 102 in accordance with illustrative embodiments of the invention. As shown, the prediction horizon 102 has a number of sampling times 106 (e.g., eleven sampling times 106, $t_0$ to $t_{10}$). In various embodiments, the sampling times 106 may also be referred to as timeslots 106. A time interval 104 may exist between each timeslot 106 (also referred to as the sampling time 104). As shown in FIGS. 6-11, the MPC optimization algorithm may be represented as a trajectory 140 of a measured variable for a number of discrete timeslots 106.

FIG. 5 schematically shows a control trajectory 140 over a given prediction horizon 102 in accordance with illustrative embodiments of the invention. For the sake of example, the optimization variable may be output power P for the distributed energy resources 14 (e.g., a battery). Thus, in this example, the trajectory 140 shows a schedule of power set points 108 for the DER 14. However, it should be understood that a variety of different state variables may be used (e.g., state of charge of a battery over 10 hours, heat flow Q in HVAC systems, for controlling output temperature of a smart thermostat etc.) from which the output variable set point can be calculated (for example, from a state of charge of a battery, the input and output power can be calculated). The trajectory 140 shows a prediction for the current timeslot $t_0$, as well as a number of future timeslots $t_1$-$t_{10}$ (also referred to as the prediction horizon 102 for the control variable P).

The control trajectory 140 is obtained by running an optimization technique (e.g., MPC) to find the value of x that minimizes the cost function J at all timeslots 106. The cost function for any given DER 14 may thus be represented as:

$$J = J_{t_0} + J_{t_1} + \ldots + J_{t_N} = \sum_{i=0}^{N} J_{t_i}$$

where $J_{t_0}$ represents the cost function at timeslot $t_0$, $J_{t_1}$ represents the cost function at timeslot $t_1$, etc. All those cost functions are dependent on the variable x. Various embodiments may use a decentralized optimization technique, wherein each of the cost functions for a timeslot may be distributed for every DER 14 in the system 100.

An optimization technique is used to find the value of x at all times that minimize the cost function. The plotted trajectory therefore may be represented by:

$$x^* = \min_{x}(J)$$

The control trajectory 140 shown in FIG. 5 represents the output of solving the optimization equation and minimizing the cost function over a set of timeslots 106. In this example, the optimization is run over a prediction horizon with a small number of time slots 102 (i.e., t0 to t11). Advantageously, the relatively small number of timeslots 106 reduces the computational burden on the controller. However, the inventors have determined that a small number of time slots prediction horizon 102 may undesirably fail to account for system dynamics that are outside of the prediction horizon 102 time (e.g., long-term dynamics). Furthermore, the inventors have determined that the small number of time slots may also may undesirably fail to account for rapidly changing system dynamics (e.g. short-term dynamics). For example, system dynamics can change quickly such that the changes occur inside the time interval 104 between consecutive timeslots 106 (e.g., between t0 and t1). Alternatively, system dynamics can be slower such that the given interval sees the dynamics as almost constant, when in reality the dynamics should impact the end-points for optimal performance.

Figure 6:
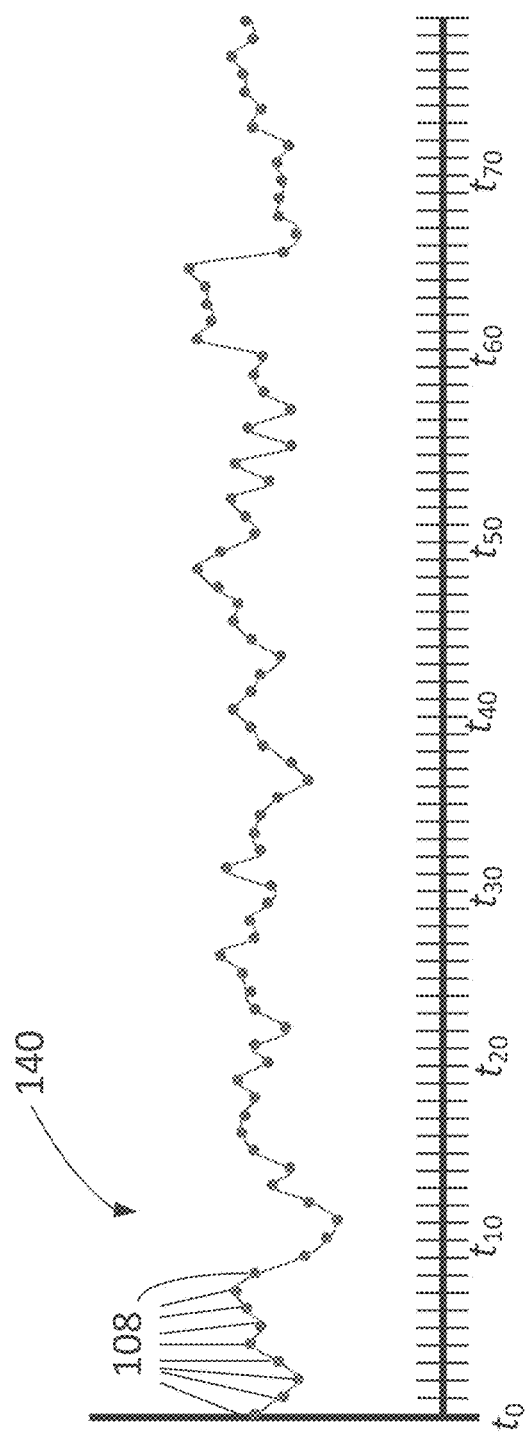
FIG. 6 schematically shows an alternative control trajectory over the same prediction horizon as FIG. 5 in accordance with illustrative embodiments.

FIG. 6 schematically shows an alternative control trajectory 140 over the same prediction horizon 102 as FIG. 5 in accordance with illustrative embodiments. However, in FIG. 6 the control trajectory 140 has a much shorter sampling rate (i.e., a greater number of control set points 108 are calculated over the same time horizon 102). Each sampled point is assigned a value (ranging from $t_0$ to $t_N$). The sampling time 104 is substantially reduced in FIG. 6 so that there are many more time slots as compared to FIG. 6. It should be understood that the greater sampling frequency advantageously provides improved outcomes by accounting for shorter term system dynamics (e.g., for a solar DER 14, intermittent cloud covering). However, those skilled in the art also understand that such greater sampling frequency undesirably leads to greater computational demands. Specifically, as known by those skilled in the art, MPC is an iterative process that recalculates an entirely new set of setpoints 108 for the entire prediction horizon 102 at each sampling time (i.e., the total number of setpoints 108 calculated by the controller generally stay the same at each new sampling time).

Figure 7:
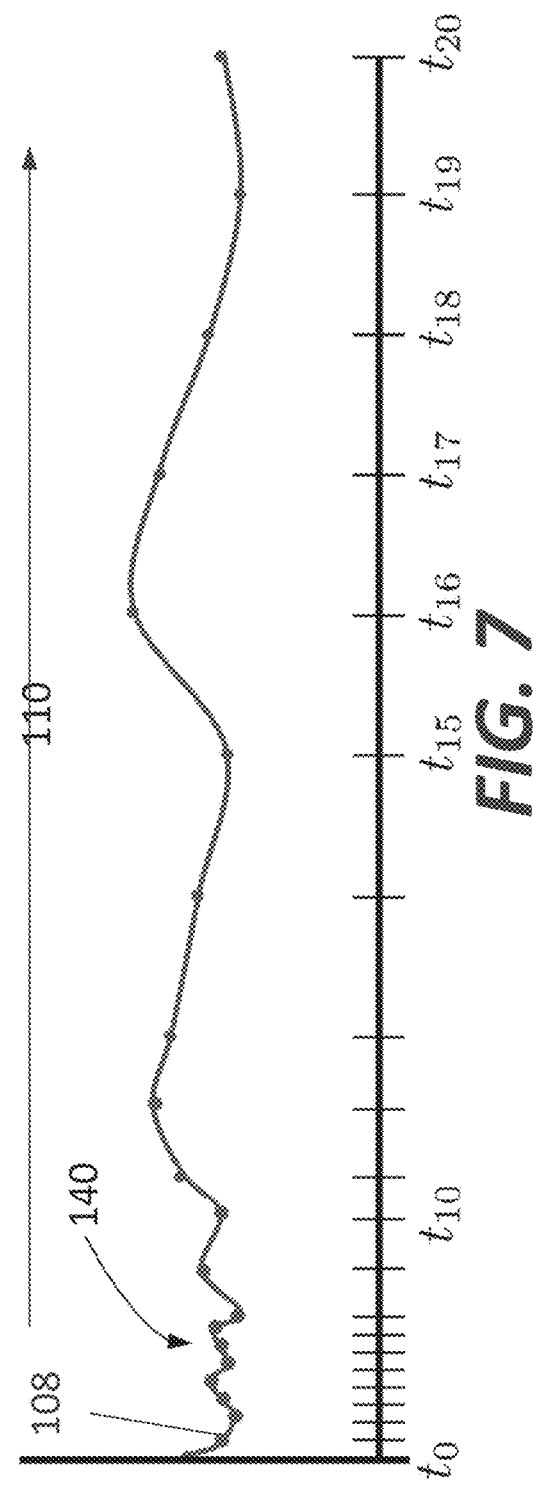
FIG. 7 schematically shows an alternative control trajectory over the same prediction horizon as FIGS. 5 and 6 in accordance with illustrative embodiments.

FIG. 7 schematically shows an alternative control trajectory 140 over the same prediction horizon 102 as FIGS. 5 and 6 in accordance with illustrative embodiments. However, in contrast with FIG. 5, FIG. 7 has a decreasing resolution 110. In other words, the MPC routine has a fast sampling rate that decreases (e.g., fast sampling rate close to $t_0$ (e.g., between $t_0$ to $t_8$), and slower sampling rate from $t_8$ to the end of the horizon. The sampling rate shown in FIG. 7 advantageously accounts for both short-term system dynamics and long-term system dynamics. Furthermore, the sampling rate shown by the MPC trajectory of FIG. 7 requires considerably less computational power than a comparable sampling rate shown in the MPC trajectory of FIG. 6.

Although FIGS. 6 and 7 show trajectories with the same initial sampling frequency (meaning the setpoint calculation is at the same frequency), the overall calculation in FIG. 7 is significantly reduced (e.g., 80 set points as opposed to 21 set points). Accordingly, this results in a large computation reduction.

However, while the MPC routine shown in FIG. 7 has fewer total set points 108 that need to be calculated, the increased resolution (e.g., shown by the many points from t0 to t1) causes the controller to run the optimization algorithm at the high sampling frequency, because the MPC routine requires resolving the optimization algorithm at every sampling point. For example, the trajectory shown in FIG. 7 has the same initial sampling rate as the trajectory shown in FIG. 6. Therefore, the optimization algorithm represented by the trajectories 140 in FIG. 6 and FIG. 7 are run at the same frequency, despite the trajectory of FIG. 7 having fewer points to solve. Thus, in various embodiments, the decreasing resolution algorithm may be undesirably computationally burdensome, particularly with regard to DER 14 applications having complex models to solve.

Figures 8A, 8B:
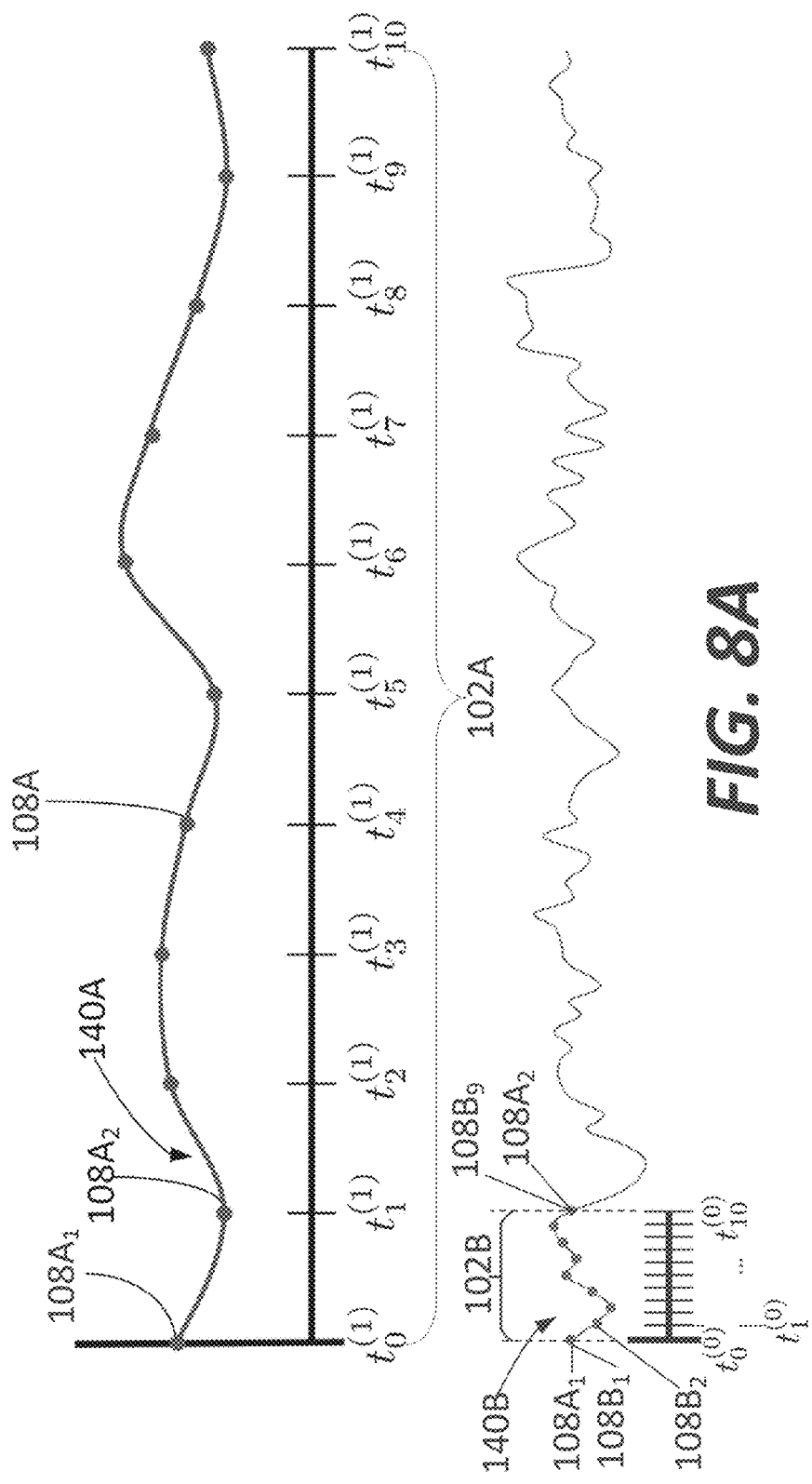
FIG. 8A schematically shows nested control trajectories over the same prediction horizon as FIGS. 5-7 in accordance with illustrative embodiments.
FIG. 8B schematically shows the second trajectory after running a second MPC optimization loop in accordance with illustrative embodiments of the invention.

FIG. 8A schematically shows nested control trajectories 140A and 140B over the same prediction horizon 102 as FIGS. 5-7 in accordance with illustrative embodiments. The inventors discovered that using two separate optimization loops advantageously provides optimization using both slow and fast system dynamics, while substantially reducing computational burden relative to other proposed methods. Accordingly, the DER 14 may be controlled in an optimal manner. Furthermore, by distributing the optimization solution to each DER 14 or a controller 16 thereof, illustrative embodiments provide a DERs system 100 that is robust, and that operates quickly and without the need for excessive computational power (e.g., as compared to a single centralized controller).

The paired MPC optimization solves the cost function for a first optimization trajectory 140A that has a low-resolution over the time horizon 102. In FIG. 8A, this first optimization trajectory 140A is represented using the nomenclature $t^{(1)}$. Using the first optimization trajectory 140A, set points 108A for the DER 14 are obtained at discrete times time for a plurality of sampling times 106: $t_0^{(1)}, t_1^{(1)}, t_2^{(1)} \ldots t_{10}^{(1)}$. Although eleven total points 108A are shown, it should be understood that various embodiments may use a longer or shorter prediction horizon 102 with more (or fewer) sampling times 106. These various set points 108A account for long-term dynamics that impact the DER 100, and accordingly the optimization algorithm has a longer horizon 102 (as compared to trajectory 140B). However, because the resolution is low, the long-term MPC algorithm does not need to be solved by the controller at a high frequency, and the computational burden is low.

The paired MPC optimization (also referred to as a nested optimization) solves the same or a reduced order model (i.e. simpler) cost function for a second optimization trajectory 140B that has a fast-resolution over the time horizon 102B. In various embodiments, the second optimization trajectory 140B has a short prediction horizon 102B. In FIG. 8A, the second optimization trajectory 140B is represented using the nomenclature) $t^{(0)}$. Using the second optimization trajectory 140B, set points 108B for the DER 14 are obtained at time $t_0^{(0)}, t_1^{(0)} \ldots t_{10}^{(0)}$. However, the set points 108A from the first trajectory 140A operate as constraints on the second trajectory 140B. In this example, the setpoints 108A₁ from sample $t_0^{(1)}$ and 108A₂ from sample $t_1^{(1)}$ operate as constraints on the nested optimization trajectory 140B. Thus, the set point 108A₁ from sample $t_0^{(1)}$ is the same as the set point 108B₁ from sample $t_0^{(0)}$ in trajectory 140B. In a similar manner, the set point 108A₂ from sample $t_1^{(1)}$ is the same as the set point 108B₉ from sample $t_{10}^{(0)}$ in trajectory 140B. Thus, in various embodiments, the end-points for the nested optimization function 140B may be constraints from the parent optimization function 140A (at least for some cycles of the optimization trajectory 140B).

The inventors discovered that the second optimization trajectory 140B advantageously accounts for short-term dynamics of the DER 140 by making control decisions in between the set points 108A₁ and 108A₂. Because the prediction horizon 102B is short, the short-term MPC algorithm does not solve for a large number of points (despite the high frequency), and the computational burden is low. In some embodiments, a reduced order model (i.e. a simplified model) can be used for the faster MPC. As known by those skilled in the art, the MPC optimization is advanced by one time interval 104 (e.g., the subsequent cycle determines control setpoints 108B₂ to 108B₁₀) and recalculated for the second cycle. This process is then repeated again.

FIG. 8B schematically shows the second trajectory 140B after running a second MPC optimization loop in accordance with illustrative embodiments of the invention. MPC is run at the initial sampling frequency. Point 108B₁ is a previous point, and is merely shown for descriptive purposes. As can be seen, the algorithm is rerun for points 108B₂ to 108B₁₀ (where the previous trajectory 140B was run for points 108B₁ to 108B₉). In this example, the constraint given by the parent or top MPC is still 108B₉ which is no longer an end-point.

FIGS. 8A-13 schematically show operation of nested functions in accordance with illustrative embodiments of the invention. In the example of FIGS. 8A-16, three optimization algorithms 140A-140C are nested together. An example of optimization setpoints (i.e., trajectory 140A-140C) is shown for each of the various optimizations.

Figure 9:
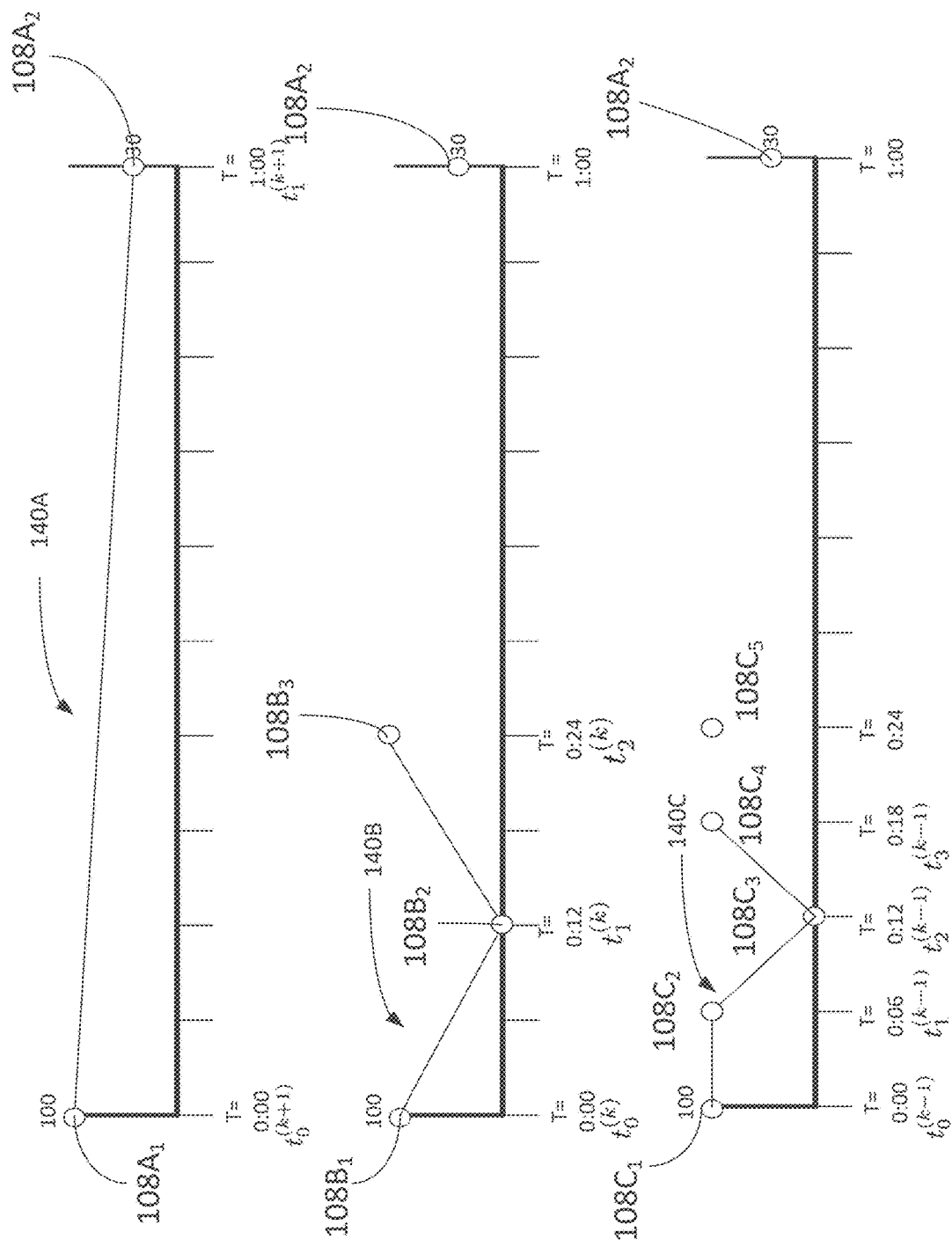
FIG. 9 schematically shows a trajectory for an optimization function that looks at system dynamics every hour.
Figure 10:
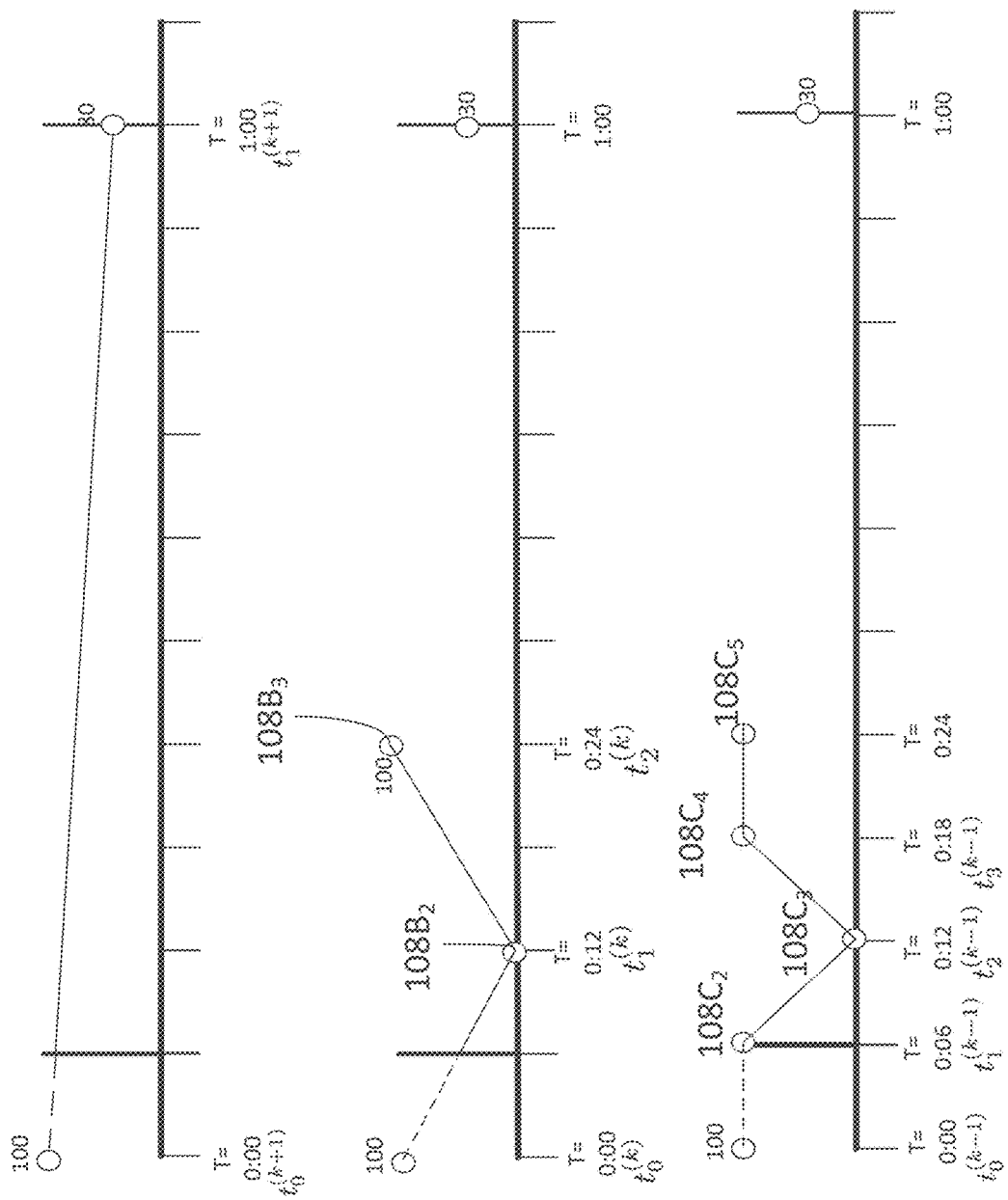
FIG. 10 schematically shows the next step in the optimization function in accordance with illustrative embodiments of the invention FIG. 11 schematically shows the MPC optimization at a different time in accordance with illustrative embodiments of the invention.
Figure 11:
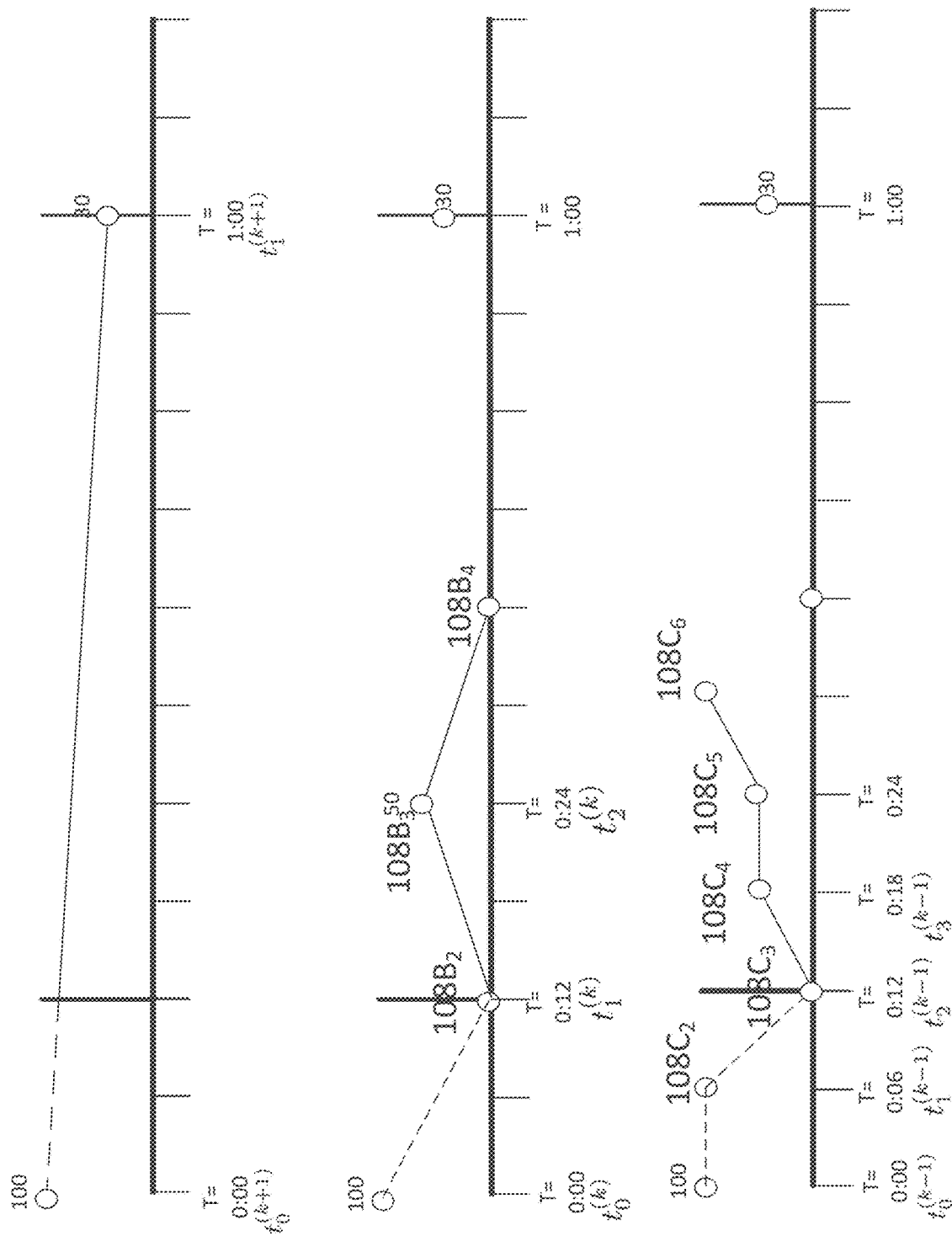

FIGS. 9-11 schematically show another example of a nested optimization routine. In this example, three optimizations are nested together using an MPC routine. FIG. 9 schematically shows a trajectory 140A for an optimization function that looks at system dynamics every hour. Accordingly, two constraints 108A₁ and 108A₂ are obtained for state variable (e.g., power output at given time).

A second optimization trajectory 140B looks at system dynamics every 12 minutes. However, the second optimization trajectory 140B is constrained by the endpoints 108A₁ and 108A₂ obtained from the slower trajectory 140A.

A third optimization trajectory 140C looks at system dynamics every 6 minutes. The third optimization trajectory 140C is constrained by the points determined by trajectory 140A and trajectory 140B. Thus, the solution to the optimization problem for both 140B and 140C at time T=0:00 must be equal to the solution obtained from the parent trajectory 140A (e.g., 108B₁ and 108C₁ are the same as 108A₁). In a similar manner, the third trajectory 140C is bounded by the second trajectory (e.g., 108B₂ is equivalent to 108C₃).

FIG. 10 schematically shows the next step in the optimization function, after time t=0:00. Because the prediction horizon for the third trajectory 140C is 18-minutes, a third point 108C₅ is determined by the function. However, 108C₅ is already constrained by point 108B₃, calculated previously.

FIG. 11 schematically shows the MPC optimization at time t=0:12. At this time, the second optimization trajectory 140B is run again. Accordingly, points 108B₂, 108B₃, and 108B₄ are determined. If system dynamics have changed, the previously calculated output point may change. For example, point 108B₃ may have a value of 50 now (instead of a value of 100, as shown in FIG. 10). Thus, the output of trajectory 140C is changed to match the changing of the constraint from the parent trajectory 140B. It is also worth noting that the routine may change non-constrained points as the optimization is re-run with every iteration. For example, the optimization algorithm may find that the setpoint 108C₄ should be adjusted when run at time T=0:12 (FIG. 11) as compared to when it was calculated at time T=0:06 (FIG. 10).

Figure 12:
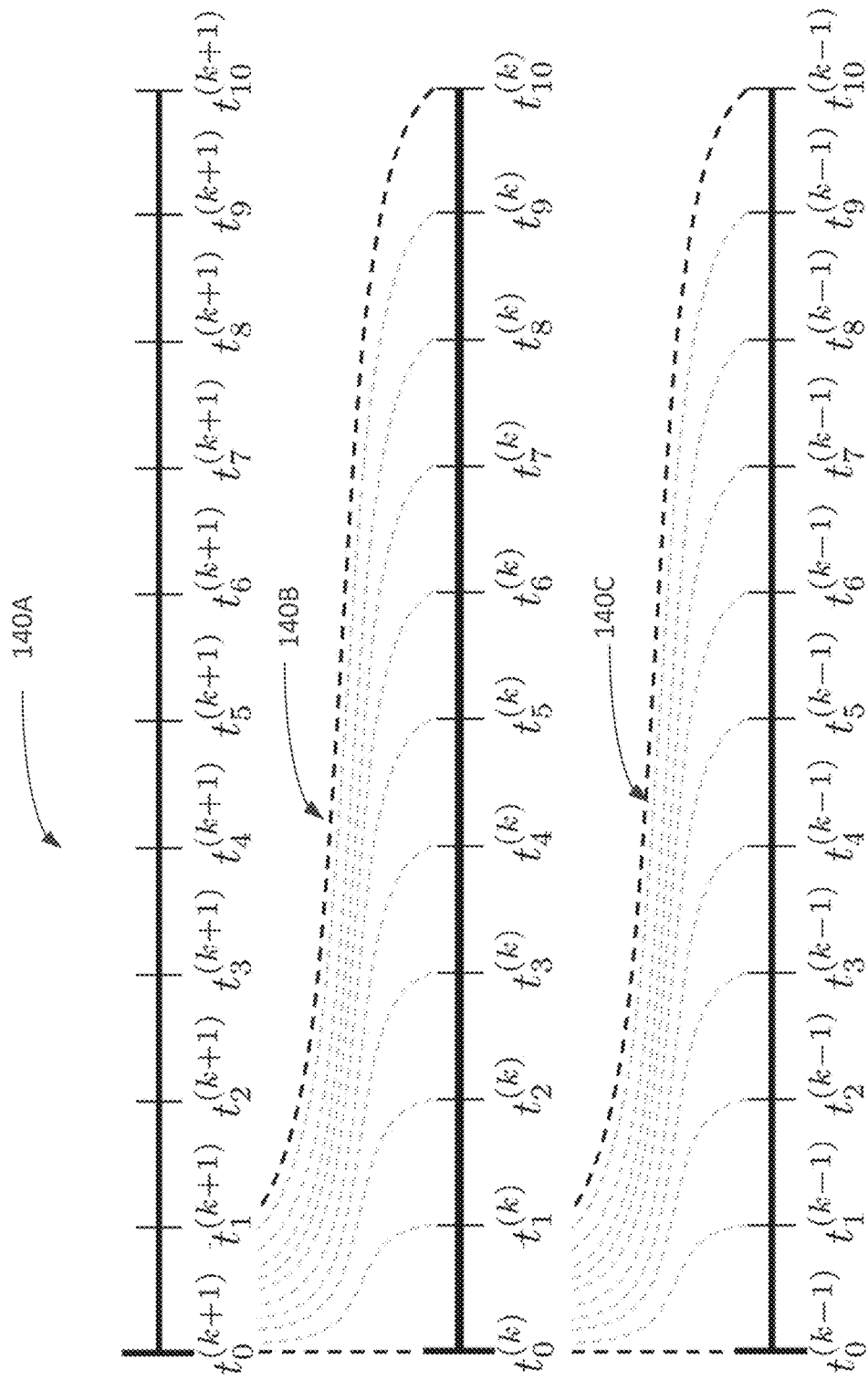
FIG. 12 schematically shows a generalization of a nesting MPC routine in accordance with illustrative embodiments.

FIG. 12 schematically shows a generalization of nesting multiple MPC loops in accordance with illustrative embodiments. For nomenclature purposes, the top function 140A is considered to be a parent function of the second function 140B, and a grandparent function of the third optimization trajectory 140C. In a similar manner, the third trajectory 140C is a child of the second trajectory and a grandchild of the first trajectory. Although only three nested functions are shown here, it should be understood that two or more functions may be nested (e.g., 3, 4, 5, 6, etc.).

Figure 13:
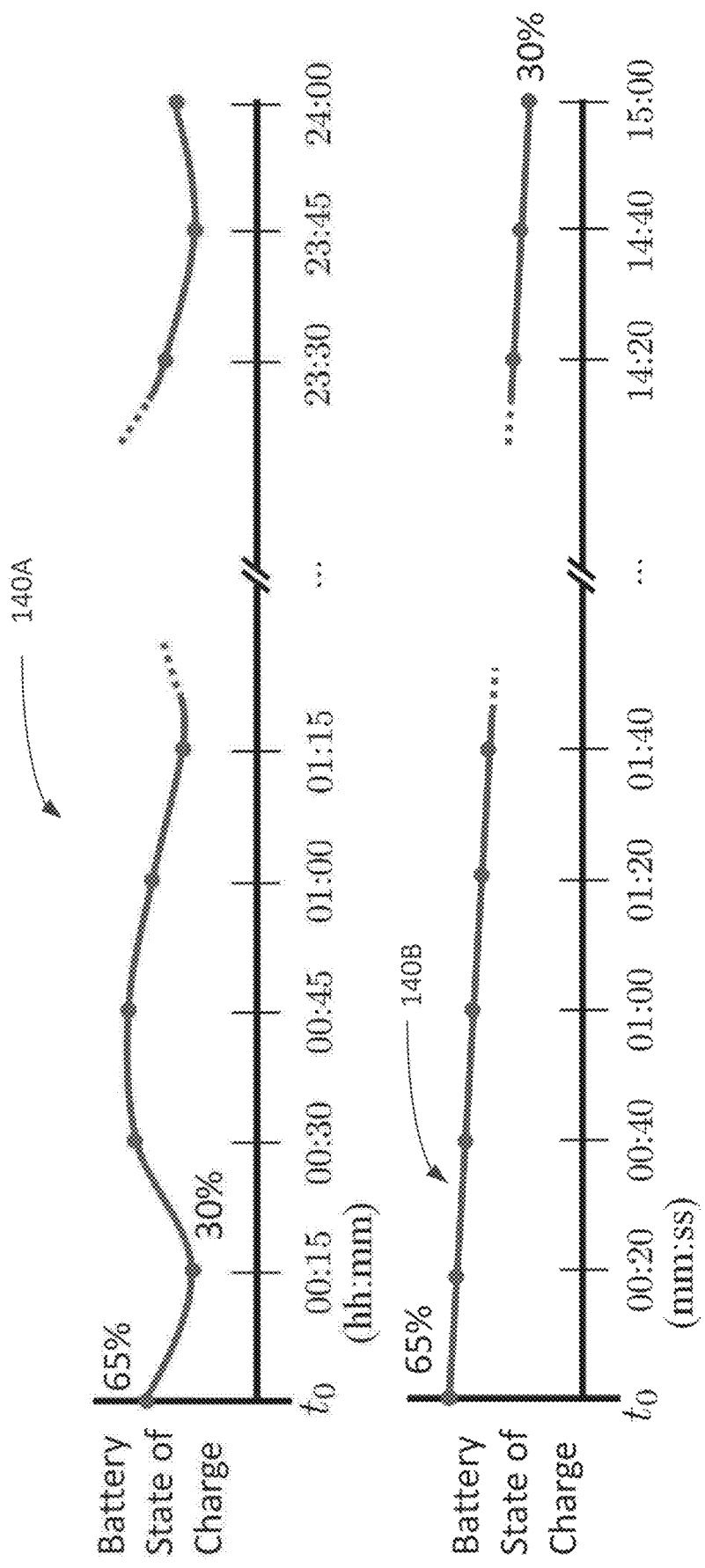
FIG. 13 schematically shows a nested MPC routine in accordance with illustrative embodiments.

FIG. 13 schematically shows a nested MPC routine in accordance with illustrative embodiments. In the example of FIG. 13, the DER 14 is a battery 14. Two MPC loops are used at different prediction horizons. An energy optimization is run having a prediction horizon of 24 hours, with 96 timeslots and time intervals of 15 minutes. First the energy optimization creates a schedule for the state of charge of the battery for the next 24 hours. Then the two first points (65% and 30%) are used as the end-point constraints for a faster power optimization. The power optimization runs over 15 minutes with 20 second time intervals. The result of the optimization gives a 20 second schedule for the first 15 minutes. The state of charge schedule can then be applied to obtain a power set point schedule by calculating how much power needs to be given or taken by the battery. As described previously, the constraints from the parent schedule apply to the child schedule.

The advantage of nesting these two MPCs is that the energy optimization (top MPC) solves a problem for 24 hours ahead without worrying about fast transients such as clouds passing by solar panels or individual loads connecting. The power optimization (bottom MPC) then solves for those fast transients and reacts to them without having to change the energy schedule.

The example shown in FIG. 13 can be expanded beyond a single DER 14. For example, consider the case where the battery is also coupled with a long-term storage component (e.g., a hydrogen system that aims to take the overgeneration of solar in the summer, produce hydrogen, and then use it in the winter). Accordingly, illustrative embodiments may thus add a long-term energy optimization, producing three prediction horizons. As an example, these prediction horizons may be as follows:

Long-term Energy: Prediction horizon of 180 days, with 180 timeslots and intervals of 1 day
Short-term Energy: Prediction horizon of 24 hours, with 96 timeslots and time intervals of 15 mins
Power: Prediction horizon of 15 minutes, with 45 timeslots and time intervals of 20 seconds In illustrative embodiments, the long-term energy MPC is solved first to obtain a daily schedule for the amount of hydrogen mass in the hydrogen tanks. Then the first two values are used as end-points for the short-term energy MPC that gives a schedule for the amount of hydrogen every 15 mins, and the SoC of batteries. Finally, we use the first two points of this MPC to run the Power loop to obtain a short-term schedule for the amount of hydrogen in the tanks and the SoC (state of charge) of batteries. Power setpoints for the batteries and the hydrogen production facility can be obtained.

Various embodiments may also operate with other control systems, such as HVAC load control. Consider the case of load control where an HVAC systems are controlled to manage temperature inside a room. The room exchanges heat through its walls and windows via conduction, and the outdoor ambient temperature has a daily cycle (day to night for example). However, there are internally also some heat sources that turn on or off quite rapidly (say for example an oven opening and closing due to some industrial process).

To properly control temperature two nested MPC loops may be defined:

Daily Cycle MPC: Create a temperature schedule and the corresponding use of an HVAC depending on user requirements (for example, minimize energy consumption).
Short-term MPC: Follow the above schedule but create actions for the HVAC to compensate for rapid injections of heat.

Furthermore, illustrative embodiments may include a third MPC loop above the daily cycle, one that creates a yearly schedule with weekly or monthly time slots to account for the summer to winter temperature variations. Notice that creating the yearly schedule in this example, does not require the MPC to deal with short-term dynamics (dealt with the short-term MPC) nor the daily cycles (dealt with the Daily Cycle MPC) so that the complexity is rather low.

As yet another example, consider the case of a single-owner fleet of electric vehicle charging from the grid through a single meter that has some time-of-use rates and demand charges. An MPC is used to create an evolving weekly schedule to maximize vehicle use while minimizing the utility bill. The schedule gives the state of charge of every vehicle at the end of each shift (for example 8 hours). However, a faster MPC loop can be used to adjust for changes within the first 8 hour interval to account, for example, for traffic slowing down some vehicles or road work making some vehicles take a longer route.

Each of the nested MPC loops described above can use either a centralized or a distributed optimization scheme. In some embodiments, distributed optimization techniques use dual decomposition or alternating direction method of multipliers (ADMM) techniques. In a distributed optimization scheme, the optimization involves the interaction of multiple agents in a sort of virtual market where a commodity is transacted. In example of FIG. 13 above, the commodity being transacted is Power for the short-term distributed MPC, and energy for the daily distributed MPC, so that there is a Power market and an Energy market, each one with a price for the commodity, and agents responses to that price.

Figure 14:
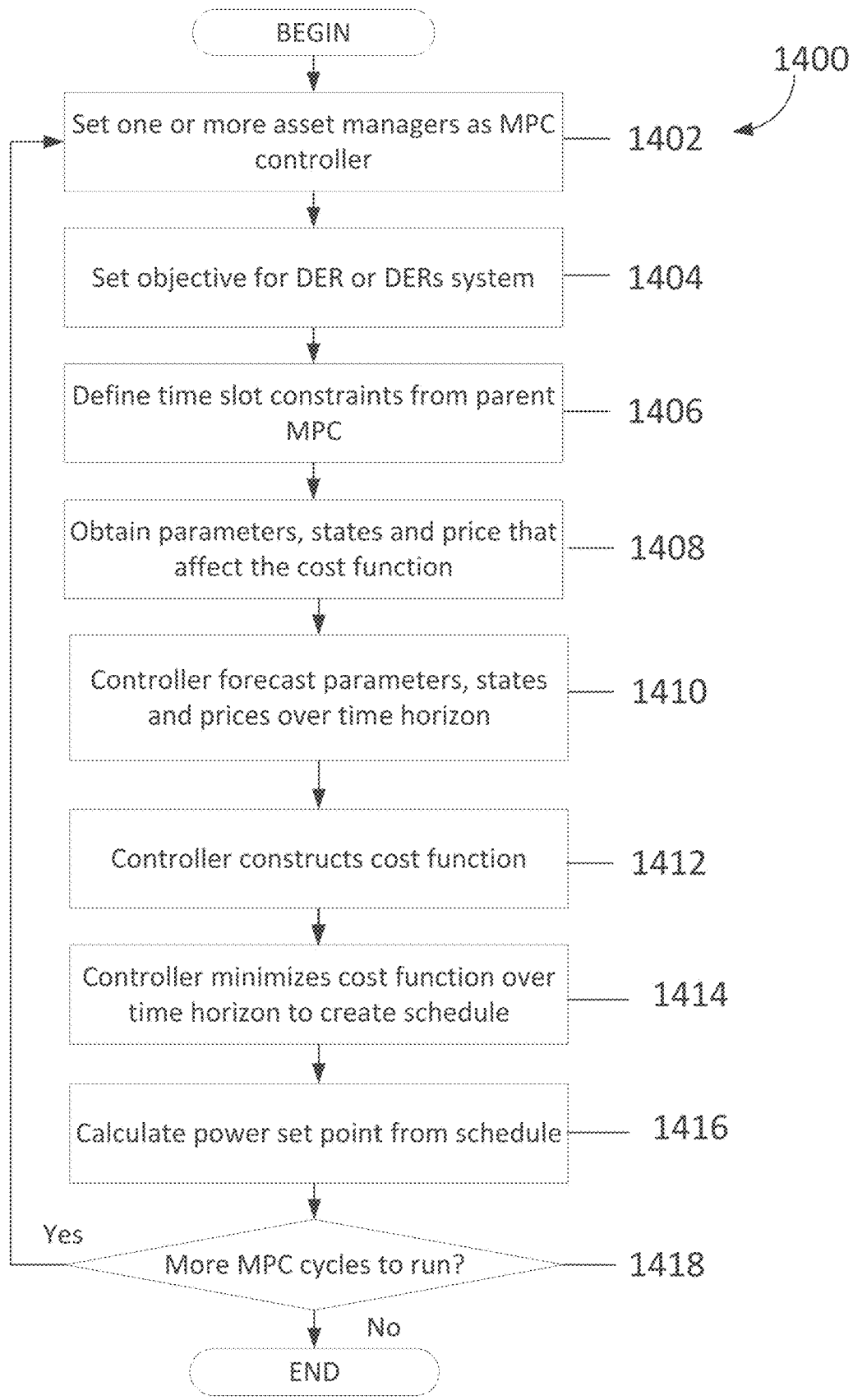
FIG. 14 schematically shows a process of optimizing the DERs system using distributed asset managers in accordance with illustrative embodiments of the invention.

FIG. 14 schematically shows a process 1400 of optimizing the DERs system 100 using nested MPC loops 16 in accordance with illustrative embodiments of the invention. It should be noted that this method is substantially simplified from a longer process that may normally be used. Accordingly, the method shown in FIG. 14 may have many other steps that those skilled in the art likely would use. In addition, some of the steps may be performed in a different order than that shown, or in parallel. Furthermore, some of these steps may be optional in some embodiments. Finally, this process shows the steps for just one MPC, but the same process could be run for all the MPC that are nested, with step 1406 being the connection between them. Accordingly, the process 1400 is merely exemplary of one process in accordance with illustrative embodiments of the invention. Those skilled in the art therefore can modify the process as appropriate.

The process begins at step 1402, which sets one or more asset managers 16 as an MPC controller 21 that calculates the price. As discussed previously, the MPC controller 21 is the one or more asset manager(s) that calculate the price using a system-level and/or local DERs cost function. In some embodiments, when distributed optimization is used, a plurality of asset managers 16 calculate respective prices (e.g., the preliminary price) that are used to determine the system level price. The MPC controller 21 also relays the price to the other asset managers 16 so as to control the output power of the assets 14 in the system 100. The one or more asset managers 16 that function as the MPC controller 21 are trusted by the other asset managers 16. In some embodiments, a first asset manager 16 is the MPC controller 21 at a first time. Then, a second asset manager 16 is the MPC controller 21 at a second time. In some other embodiments, a plurality of asset managers 16 may be the authority simultaneously. FIGS. 6A-3C below schematically show various schemes of one or more asset managers 16 functioning as the authority to determine the system level price.

Returning to FIG. 14, the process 1400 proceeds to step 1404, which sets an objective for the DERs system 100. An objective setter 30 and a meter 32 send information to the one or more asset manager 16 in accordance with illustrative embodiments of the invention. In some embodiments, the objective setter is the entity that determines how the coordinated DERs system 100 behaves. For example, the objective setter 30 may set goals such as maintaining power flow at a certain level, frequency support, etc. The objective may also be received from an external source or user.

In some embodiments, the objective setter is a centralized agent, such as a utility 5, a Supervisory Control and Data Acquisition ("SCADA") system or a Building Management System ("BMS"), etc. Alternatively, the objective setter can be one or more asset managers 16 (e.g., as a modulate in FIG. 2). In other embodiments, one or more objectives can be programmed in a plurality of the asset managers 16, thereby removing the need for a single objective setter (e.g., where the system 100 maintains the point of common coupling 12 power flow at zero or some other pre-determined level).

As described previously, the objective may be a desired total power output from all of the assets 14 (including loads 15) in the system 100. In illustrative embodiments, an objective setter 30 determines the DERs system 100 objective. For example, the objective setter 30 may be a utility company, and/a person acting as an operator. In illustrative embodiments, the objective is set based on external and/or internal system 100 conditions. An external condition may be, for example, that a predefined amount of power needs to be supplied to the grid 14. An internal condition may be, for example, that a charge on a battery load in the system 100 is too low, and that the battery needs to be charged. The objective is received by one or more of the asset managers 16. In some embodiments, the asset managers 16 are configured to actively look for information relating to the objective. In some embodiments, the objective setter 30 may broadcast the objective to all of the asset managers 16. Alternatively, the variables may be forward to only a subset of the asset managers 16.

Among other things, the objective may define a predefined power output of the system 100 during a first time (e.g., during the day), and a different predefined power output of the system 100 during a second time (e.g., during the night). Additionally, or alternatively, the objective may be an immediate power output at the current time. In some embodiments, the power output of the system 100 may be measured at the point of common coupling 12, through which the power from all of the assets 14 in the system 100 passes.

At step 1406, the MPC defines constraints from a parent MPC at the end-points or at any other time slot as required. This was described in the sections above, for example with respect to FIG. 13. It should be noted that for the highest-level (e.g., trajectory 140A), that step 1406 is skipped, and the process proceeds directly to step 1408.

At step 1408, the process obtains parameters, states and prices that affect the objective. For example, the meter of FIG. 5 monitors and/or measures the parameters that affect the objective. The meter may be, for example, a voltage and/or a current meter. The meter may be coupled with, and/or part of, one or more of the asset managers 16. The measured parameters are received by one or more of the asset managers. In some embodiments, the asset managers 16 are configured to actively look for information relating to the parameters measured by the meter. In some embodiments, the meter may monitor and broadcast the variables (e.g., that are measured) that affect the objective to all of the asset managers 16. Alternatively, the variables may be forward to only a subset of the asset managers 16. The price may be obtained via the interface 18 of FIG. 2 that allows communication between asset managers.

In some embodiments, the meter monitors and tells the asset managers 16 what the current status of the system 100 is. This information may be used as a point of comparison to the system objectives. In illustrative embodiments, the meter measures the power flow at the point of common coupling 12. In some other embodiments, one or more devices can be exclusively used as the meter, while in other embodiments, one or more asset managers 16 can be the meter. For example, when operating off-the-grid and the DER is the "master" or "grid-forming," the asset manager 16 maybe the meter.

At step 1410 the controller forecasts parameters, states and prices at every time slot over the time horizon using any forecasting technique. In some embodiments, this forecasting can be done using historical data, and in others it can be done using external inputs such as weather forecast services.

At step 1412, the MPC controller 21 uses the information relating to the objective, the measured parameters, states and prices, the forecasted parameters, states and prices and a model of a particular DER 14 or DERs system 100 to calculate the cost function at every time slot over a time horizon 102 for an MPC routine For example, the asset manager 16 may receive the relevant objective and meter information via the interface 18. That information may be stored in the memory 22. Additionally, as described previously, in some embodiments the price calculation engine 20 may calculate the price required to perform a distributed optimization.

As discussed previously, preferably the first MPC time horizon 102 accounts for long-term system dynamics. For example, as shown in FIG. 13, the first MPC trajectory 140A has a horizon of 24 hours. Furthermore, the first optimization trajectory preferably has an increased time interval 104 relative to the second optimization trajectory (e.g., 15 minutes as opposed to 20 seconds as shown in FIG. 13). Two initial constraints are obtained at step 1408 (e.g., 65% battery at 0 minutes, and 30% battery at 15 minutes).

The process proceeds to step 1414, where the controller 21 minimizes the cost function to calculate a schedule for the value of a state variable or the output power at every time slot.

At step 1416, the output power set point is calculated from a state variable schedule if required.

The process then proceeds to step 1418, which asks whether a new cycle of MPC optimization should be run against over a new temporal horizon that has moved one step forward. With reference to FIG. 13, and as known by those of skill in the art, the second optimization trajectory 140B is recalculated at every selected time interval (E.g., every 20 seconds in FIG. 13). In a similar manner, the first optimization trajectory is recalculated every 15 minutes in FIG. 13. Accordingly, if the time has come to recalculate the optimization trajectories over a new tome horizon (e.g., in trajectory 140A, instead of a horizon 102 from 0 minutes to 24 hours, the new horizon is moved 15 minutes to 24 hours and 15 minutes). As described previously, the constraints (including changes constraints) from higher level parent optimizations are applied to the child optimization.

When the optimization algorithm is finished, the process 1400 comes to an end.

In some embodiments, a price signal for every MPC loop is shared among the assets and it is one of the parameters that affect the cost function. The price is obtained in step 1408.

Therefore, the process 1400 can be applied with centralized, distributed or decentralized optimization techniques without modification.

Figure 15A:
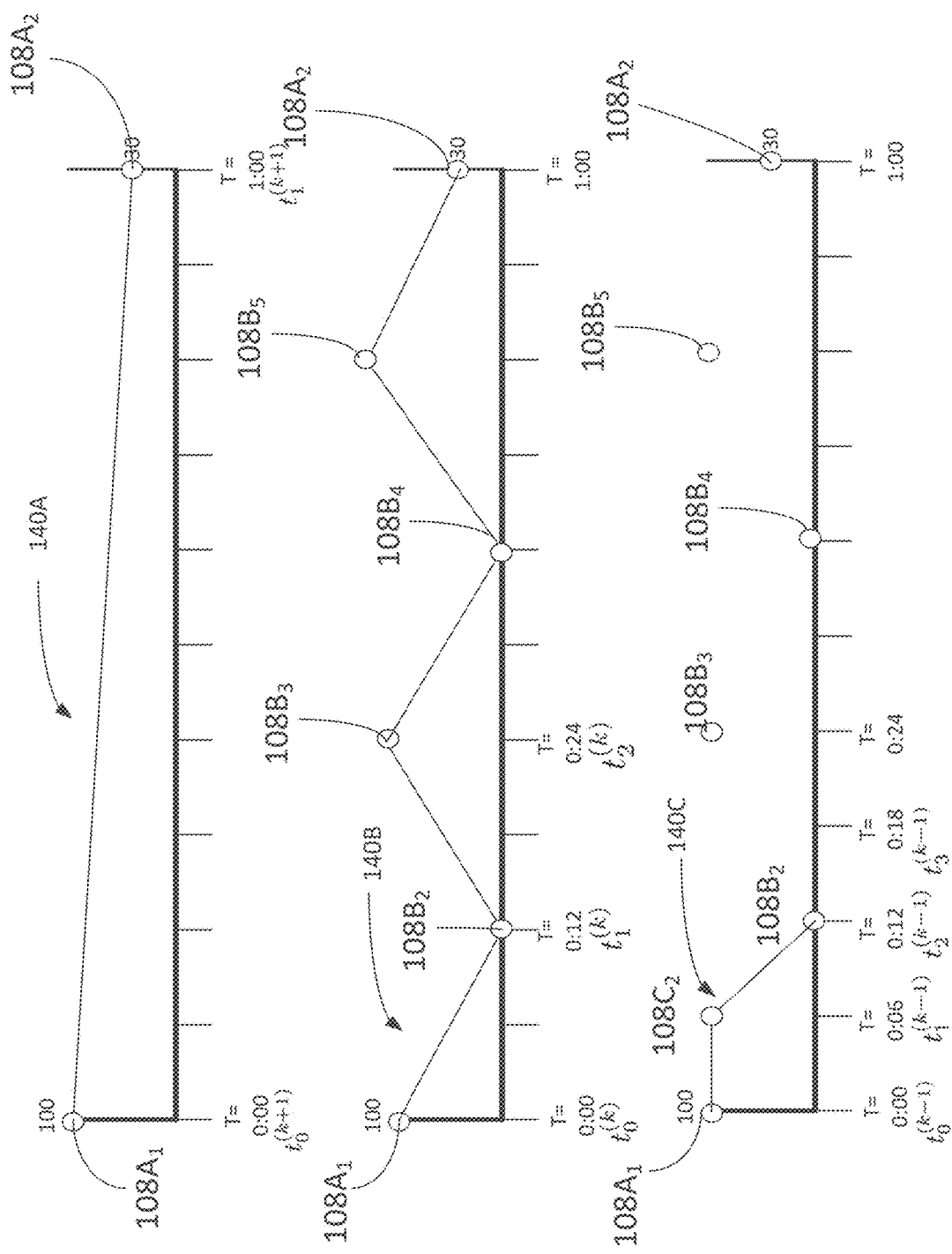
FIGS. 15A-15C schematically show another example of a nested optimization routine in accordance with illustrative embodiments of the invention It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.
Figure 15B:
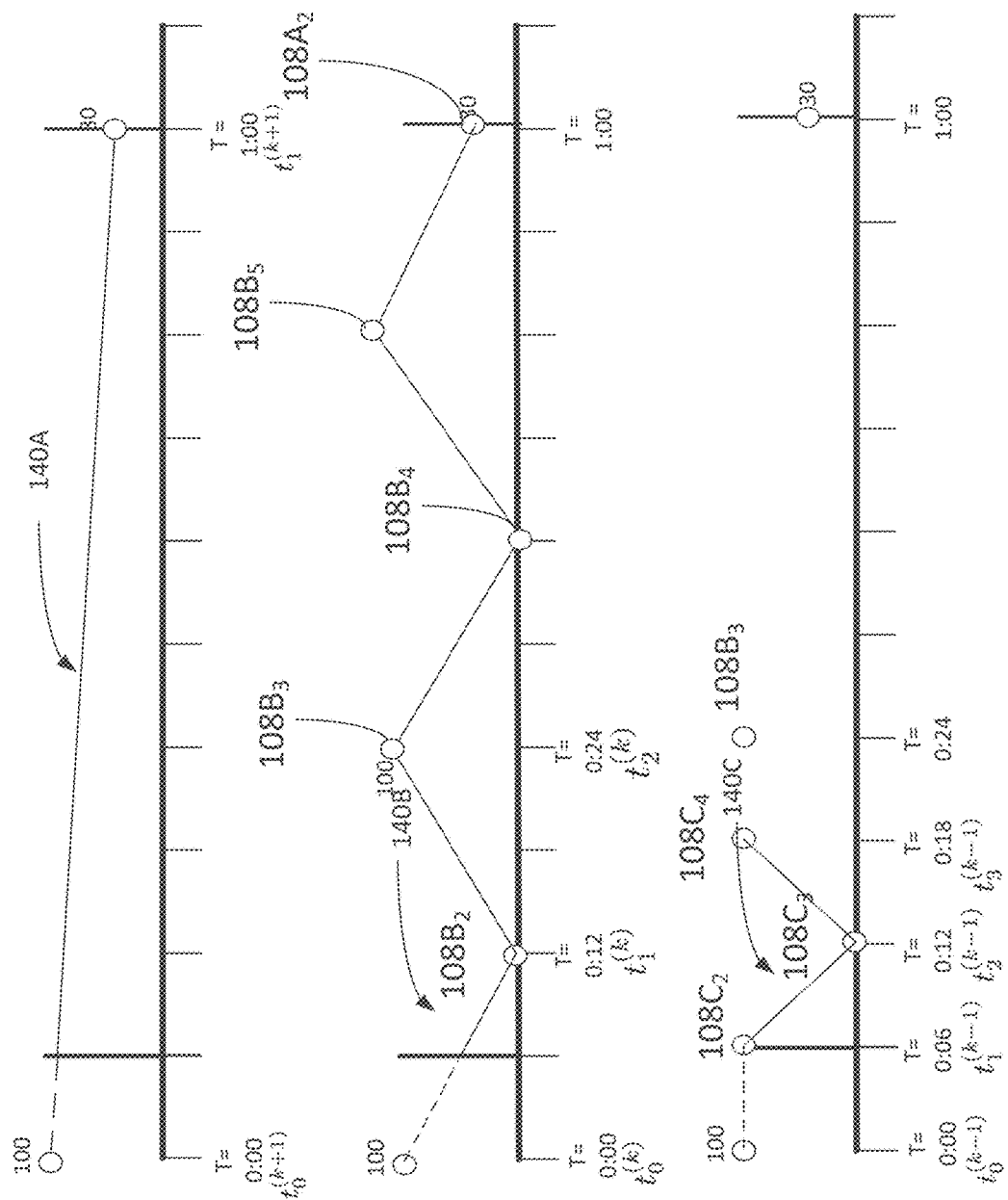
Figure 15C:
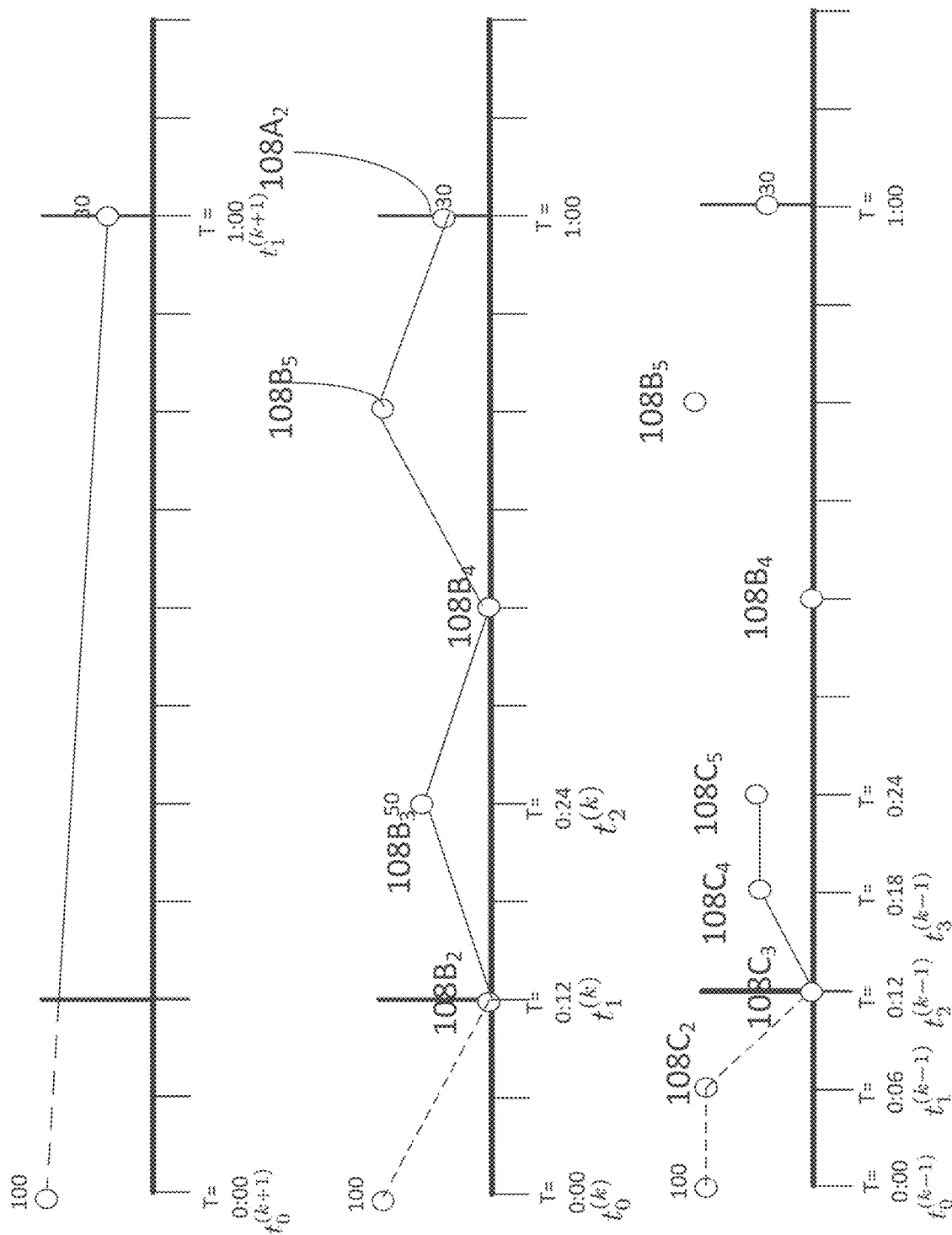

FIGS. 15A-15C schematically show another example of a nested optimization routine in accordance with illustrative embodiments of the invention. Three trajectories 140A-140C are calculated in FIG. 15A at time t=0. The third trajectory 140C is recalculated in FIG. 15B. The second and third trajectories 140B, 140C are recalculated in FIG. 15C.

FIGS. 15A-15C are similar to FIGS. 9-11. However, the prediction horizon 102 of the second trajectory 140B is completely bounded between the first set of endpoints 108A$_1$ and 108A$_2$ of the first trajectory 140A. In other words, the prediction horizon of the second trajectory stretches from the first end point 108A$_1$ to the second end point 108A$_2$. Similarly, the prediction horizon of the third trajectory 140C is completely bounded by the two setpoints 108B$_1$ and 108B$_2$ of the second trajectory 140B. This is the case at least initially at the onset of the routine.

As shown in FIG. 15B, the third trajectory 140C is no longer bounded completely within the first set point, as the third trajectory has advanced forward one time position (i.e., 6 minutes) to position 108C$_4$.

In FIG. 15C it can be seen that the optimization has reached time T=0:12. At this time, the second point 108B$_2$ in the second trajectory 140B is reached. Accordingly, the controller 21 recalculates the second optimization trajectory 140B in accordance with the MPC routine. It may be determined that the remainder of the trajectory 140B does not change, but in this example, setpoint 108B$_3$ has changed (e.g., because of changes to system dynamics).

FIG. 15C shows the trajectories 140A-140C at the next time interval. At this time interval (e.g., T=0:12), the third setpoint 108C$_3$ of the third trajectory 140C is used to control the output of the DER 14. Furthermore, the controller 21 now recalculates the third trajectory 140C in accordance with the MPC routine over the prediction horizon. It should be noted that the process recalculates the various setpoints over the prediction horizon to account for the most recent changes in system dynamics. Changes in system dynamics and/or in the objective may cause changes in the setpoints. For example, setpoint 108C$_4$ changed from FIG. 15B to FIG. 15C. Setpoint 108C$_5$ has also changed, but because 108C$_5$ is constrained by the second trajectory. Thus, any time 108B$_3$ changes, 108C$_5$ also changes.

Various embodiments of the invention may be implemented at least in part in any conventional computer programming language. For example, some embodiments may be implemented in a procedural programming language (e.g., "C"), as a visual programming process, or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., as in any methods, flow charts, or logic flows described above) may be implemented as a computer program product for use with a computer system. Such implementation may include a series of computer instructions fixed either on a tangible, non-transitory, non-transient medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory devices, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Illustrative embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems are necessarily non-conventional because, absent special programming or configuration, the conventional components do not inherently perform the described non-conventional functions.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the above discussion discloses various exemplary embodiments of the invention, it should be apparent that those skilled in the art can make various modifications that will achieve some of the advantages of the invention without departing from the true scope of the invention.

What is claimed is:

1. A method of controlling a distributed energy resource, the method comprising:
    obtaining a model of a distributed energy resource or a system of distributed energy resources;
    determining a first trajectory of desired power output or a state of the distributed energy resource over the course of a first prediction horizon by minimizing a cost function associated with the model, the first prediction horizon having a first temporal length and a first plurality of set points;
    determining a second trajectory of desired power output or a state of the distributed energy resource over the course of a second prediction horizon by minimizing a cost function associated with the model, the second prediction horizon having a second temporal length and a second plurality of set points; and
    constraining the second trajectory as a function of the first plurality of set points or states,
    wherein the first temporal length is greater than the second temporal length,
    wherein a time interval between sampling times in the first trajectory is greater than the time interval between sampling times in the second trajectory.

2. The method as defined by claim 1, further comprising:
    determining a third trajectory of desired power output of the distributed energy resource over the course of a third prediction horizon by minimizing the cost function associated with the model, the third prediction horizon having a third temporal length and a third plurality of set points.

3. The method as defined by claim 2, further comprising:
    constraining the third trajectory based on the first plurality of set points and the second plurality of set points,
    wherein the second temporal length is greater than the third temporal length,
    wherein a time interval between sampling times in the second trajectory is greater than the time interval between sampling times in the third trajectory.

4. The method as defined by claim 2, wherein a model predictive control routine is used to recalculate the second trajectory.

5. The method as defined by claim 1, wherein a plurality of asset managers independently solve their own first trajectory and second trajectory in a distributed and decentralized manner.

6. The method as defined by claim 1, wherein a model predictive control routine is used to recalculate the first trajectory.

7. The method as defined by claim 1, wherein the distributed energy resource is part of an HVAC system.

8. The method as defined by claim 1, wherein the distributed energy resource is a battery.

9. The method as defined by claim 1, wherein the first trajectory and the second trajectory are nested together, and end points of the second plurality of set points are the same as two set points of the first plurality of set points.

10. A computer program product for use on a computer system for distributing power from an aggregated distributed energy resources system ("DERs system") having a plurality of assets, the computer program product comprising a tangible, non-transient computer usable medium having computer readable program code thereon, the computer readable program code comprising:
    program code for determining a first trajectory of desired power output or a state of the DERs system over the course of a first prediction horizon by minimizing a cost function associated with a DER model or a DERs system model, the first prediction horizon having a first temporal length and a first plurality of set points;
    program code for determining a second trajectory of desired power output or a state of the DERs system over the course of a second prediction horizon by minimizing a cost function associated with the DER model, the second prediction horizon having a second temporal length and a second plurality of set points; and
    program code for determining constraining the second trajectory as a function of the first plurality of set points or states,
    wherein the first temporal length is greater than the second temporal length,
    wherein a time interval between sampling times in the first trajectory is greater than the time interval between sampling times in the second trajectory.

11. The computer program product of claim 10, further comprising:
    program code for determining a third trajectory of desired power output of the DERs system over the course of a third prediction horizon by minimizing the cost function associated with the DER model, the third prediction horizon having a third temporal length and a third plurality of set points.

12. The computer program product of claim 11, further comprising:
    program code for constraining the third trajectory based on the first plurality of set points and the second plurality of set points,
    wherein the second temporal length is greater than the third temporal length,
    wherein a time interval between sampling times in the second trajectory is greater than the time interval between sampling times in the third trajectory.

13. The computer program product of claim 10, wherein the program code is distributed among a plurality of asset managers who independently solve their own first trajectory and second trajectory in a distributed and decentralized manner.

14. A method of controlling a distributed energy resources, the method comprising:
receiving a request for power from a distributed energy resources system;
using a model predictive control routine and an asset model:
to calculate a first predicted operational trajectory as a function of a current operational state of the distributed energy resource, the at least one predicted operational trajectory having a first prediction horizon and a first plurality of timeslots along the first prediction horizon where the asset model is solved and optimized;
to calculate a second predicted operational trajectory as a function of a current operational state of the distributed energy resource, the second predicted operational trajectory having a second prediction horizon that is temporally shorter than the first prediction horizon, the second predicted operational trajectory having a second plurality of timeslots along the second prediction horizon where the asset model is solved and optimized, the time interval between timeslots in the second predicted operational trajectory being temporally shorter than the time interval between timeslots in the first predicted operational trajectory;
wherein the first predicted operational trajectory and the second predicted operational trajectory are nested together, and end timeslots of the second plurality of timeslots are the same as two timeslots of the first plurality of timeslots.

15. A system configured to control distribution of power within an aggregated distributed energy resources system ("DERs system") having a plurality of assets, the asset manager being configured to solve a given asset model, the asset manager comprising:
an asset model configured to model a real asset;
an interface configured to communicate with at least one other asset manager and/or a central controller in the DERs system, the interface further configured to receive asset information relating to the real asset;
an asset controller configured to optimize a setpoint of the asset by determining:
a first trajectory over the course of a first prediction horizon by minimizing a cost function associated with a DER model or a DERs system model, the first prediction horizon having a first temporal length and a first plurality of set points, and
a second trajectory over the course of a second prediction horizon by minimizing a cost function associated with the DER model or the DERs system model, the second prediction horizon having a second temporal length and a second plurality of set points, the asset controller configured to constrain the second trajectory based on the first plurality of set points,
wherein the first temporal length is greater than the second temporal length,
wherein a time interval between sampling times in the first trajectory is greater than the time interval between sampling times in the second trajectory,
the asset manager further configured to control the real asset in accordance with the set points determined by the optimization.

16. The system as defined by claim 15, wherein the asset manager optimizes the setpoint by determining a third trajectory over the course of a third prediction horizon by minimizing the cost function associated with the DER model or DERs system model, the third prediction horizon having a third temporal length and a third plurality of set points.

17. The system as defined by claim 16, wherein the asset manager is configured to constrain the third trajectory based on the first plurality of set points and the second plurality of set points,
wherein the second temporal length is greater than the third temporal length,
wherein a time interval between sampling times in the second trajectory is greater than the time interval between sampling times in the third trajectory.

18. The system as defined by claim 16, wherein a model predictive control routine is used to recalculate the second trajectory.

19. The system as defined by claim 15, wherein the asset manager solves its own optimization trajectory in a distributed and decentralized manner.

20. The system as defined by claim 15, wherein a model predictive control routine is used to recalculate the first trajectory.

* * * * *